(12) United States Patent
Golas et al.

(10) Patent No.: US 11,049,269 B2
(45) Date of Patent: Jun. 29, 2021

(54) MOTION BASED ADAPTIVE RENDERING

(71) Applicant: Samsung Electronics Co., Ltd., Suwon-si (KR)

(72) Inventors: Abhinav Golas, San Bruno, CA (US); Nicholas Sohre, Saint Paul, MN (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/730,462

(22) Filed: Dec. 30, 2019

(65) Prior Publication Data
US 2020/0143550 A1 May 7, 2020

Related U.S. Application Data

(63) Continuation-in-part of application No. 15/913,776, filed on Mar. 6, 2018, now Pat. No. 10,643,339, which is a continuation of application No. 14/743,700, filed on Jun. 18, 2015, now Pat. No. 9,928,610.

(Continued)

(51) Int. Cl.
| | |
|---|---|
| G06K 9/62 | (2006.01) |
| G09G 5/36 | (2006.01) |
| G06T 5/00 | (2006.01) |
| G06T 11/00 | (2006.01) |
| G06T 1/60 | (2006.01) |
| G06T 7/33 | (2017.01) |
| G06T 7/30 | (2017.01) |
| G06T 7/32 | (2017.01) |
| G06T 15/00 | (2011.01) |

(52) U.S. Cl.
CPC ............ *G06T 7/337* (2017.01); *G06K 9/6202* (2013.01); *G06T 1/60* (2013.01); *G06T 5/001* (2013.01); *G06T 7/30* (2017.01); *G06T 7/32* (2017.01); *G06T 11/001* (2013.01); *G06T 15/005* (2013.01); *G06T 2200/12* (2013.01); *G06T 2207/10016* (2013.01); *G06T 2207/10028* (2013.01); *G06T 2207/20192* (2013.01); *G09G 5/363* (2013.01)

(58) Field of Classification Search
CPC combination set(s) only.
See application file for complete search history.

(56) References Cited

U.S. PATENT DOCUMENTS

| | | | |
|---|---|---|---|
| 6,664,959 B2 | 12/2003 | Duluk, Jr. et al. | |
| 7,755,624 B1 | 7/2010 | Hakura et al. | |

(Continued)

*Primary Examiner* — Wesner Sajous
(74) *Attorney, Agent, or Firm* — Lewis Roca Rothgerber Christie LLP

(57) ABSTRACT

A method of performing adaptive shading of image frames by a graphics processing unit (GPU) includes determining, by the GPU, a first shading rate based on determining that a change in a plurality of underlying assets between a first image frame and a second image frame is above a first threshold; determining, by the GPU, a second shading rate based on determining that one or more viewports in the second image frame is similar to one or more viewports in the first image frame; determining, by the GPU, a third shading rate based on determining that a quality reduction filter is used; and selecting, by the GPU, a shading rate from among the first shading rate, the second shading rate, and the third shading rate for the first image frame.

20 Claims, 24 Drawing Sheets

Related U.S. Application Data

(60) Provisional application No. 62/863,856, filed on Jun. 19, 2019, provisional application No. 62/018,221, filed on Jun. 27, 2014, provisional application No. 62/018,228, filed on Jun. 27, 2014, provisional application No. 62/018,254, filed on Jun. 27, 2014, provisional application No. 62/018,274, filed on Jun. 27, 2014.

(56) References Cited

U.S. PATENT DOCUMENTS

| | | | |
|---|---|---|---|
| 8,970,584 B1 * | 3/2015 | Aila | G06T 13/80 345/420 |
| 9,875,552 B1 | 1/2018 | Savage et al. | |
| 2003/0218614 A1 | 11/2003 | Lavelle et al. | |
| 2003/0227552 A1 | 12/2003 | Watanabe | |
| 2005/0078214 A1 * | 4/2005 | Wong | H04N 7/014 348/452 |
| 2005/0100319 A1 | 5/2005 | Saed | |
| 2005/0259740 A1 | 11/2005 | Kobayashi et al. | |
| 2007/0035707 A1 | 2/2007 | Margulis | |
| 2007/0296824 A1 | 12/2007 | Paine et al. | |
| 2008/0044088 A1 | 2/2008 | Nakai et al. | |
| 2009/0252411 A1 | 10/2009 | Siddiqui et al. | |
| 2011/0141136 A1 | 6/2011 | Cardno et al. | |
| 2012/0154411 A1 | 6/2012 | Cheng | |
| 2012/0200559 A1 | 8/2012 | Ahn et al. | |
| 2012/0253061 A1 | 10/2012 | Takahashi | |
| 2012/0257011 A1 | 10/2012 | Mengwasser | |
| 2012/0327077 A1 | 12/2012 | Tung | |
| 2014/0028669 A1 | 1/2014 | Tsukagoshi et al. | |
| 2014/0125650 A1 | 5/2014 | Neill | |
| 2014/0135924 A1 * | 5/2014 | Renke | B32B 27/08 623/8 |
| 2014/0184623 A1 | 7/2014 | Frascati et al. | |
| 2015/0294498 A1 * | 10/2015 | Mei | G06T 13/80 345/420 |
| 2015/0379674 A1 | 12/2015 | Golas et al. | |
| 2015/0379692 A1 | 12/2015 | Golas et al. | |
| 2015/0379727 A1 | 12/2015 | Golas et al. | |
| 2015/0379734 A1 | 12/2015 | Goias et al. | |
| 2016/0088287 A1 | 3/2016 | Sadi et al. | |
| 2016/0163087 A1 | 6/2016 | Cho et al. | |
| 2016/0307297 A1 | 10/2016 | Akenine-Moller et al. | |
| 2017/0178397 A1 | 6/2017 | Hillesland | |
| 2017/0365032 A1 * | 12/2017 | Westerhoff | H04L 51/00 |
| 2018/0310016 A1 | 10/2018 | Kopietz | |

* cited by examiner

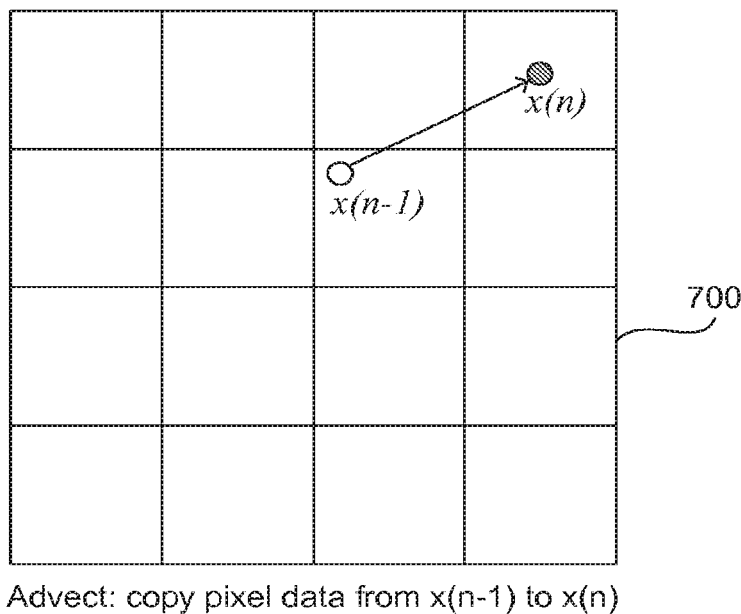
Advect: copy pixel data from x(n-1) to x(n)
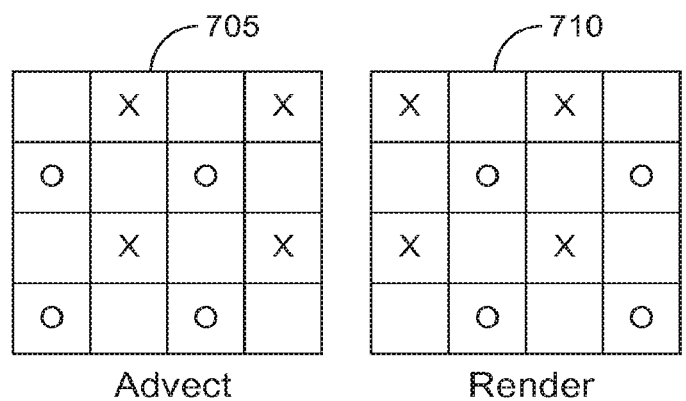
Advect    Render
*FIG. 7A*

Example Sampling Pattern For Interpolation. X Marks Rendered
Samples And O Is An Example Of An Interpolation Location

FIG. 9

Example Sampling Pattern For Interpolation In Which 8 samples are rendered. X Marks Rendered Samples in first group of four pixels And O Marks second group of rendered four pixels

FIG. 10

Advection vs. Spline Reconstruction
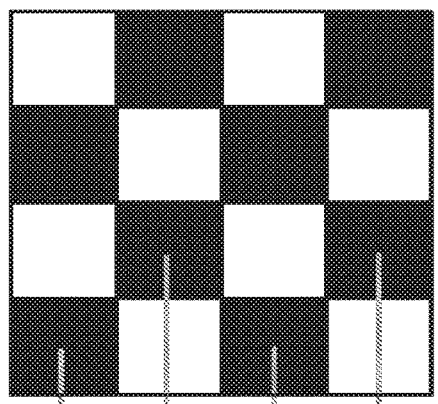
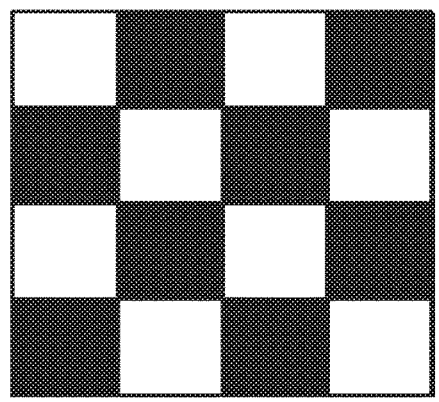
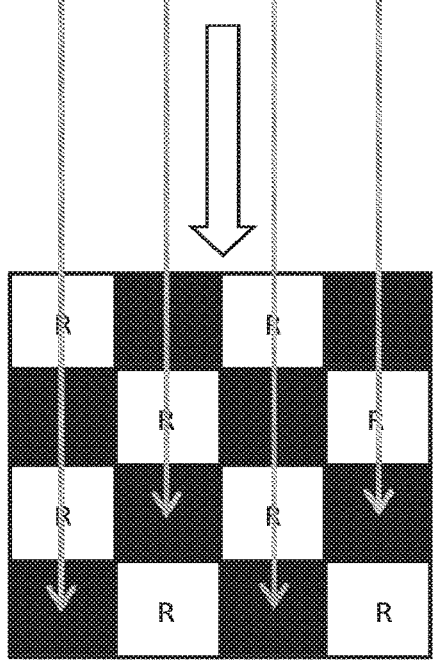
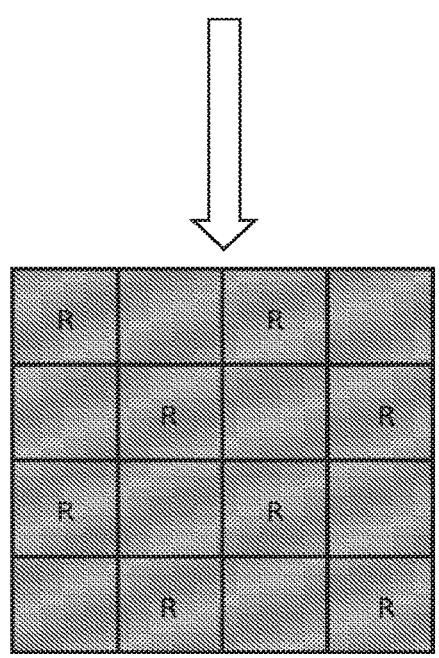
Velocity=0 →Advect          Velocity=+0.5 X →Reconstruct
*FIG. 14*

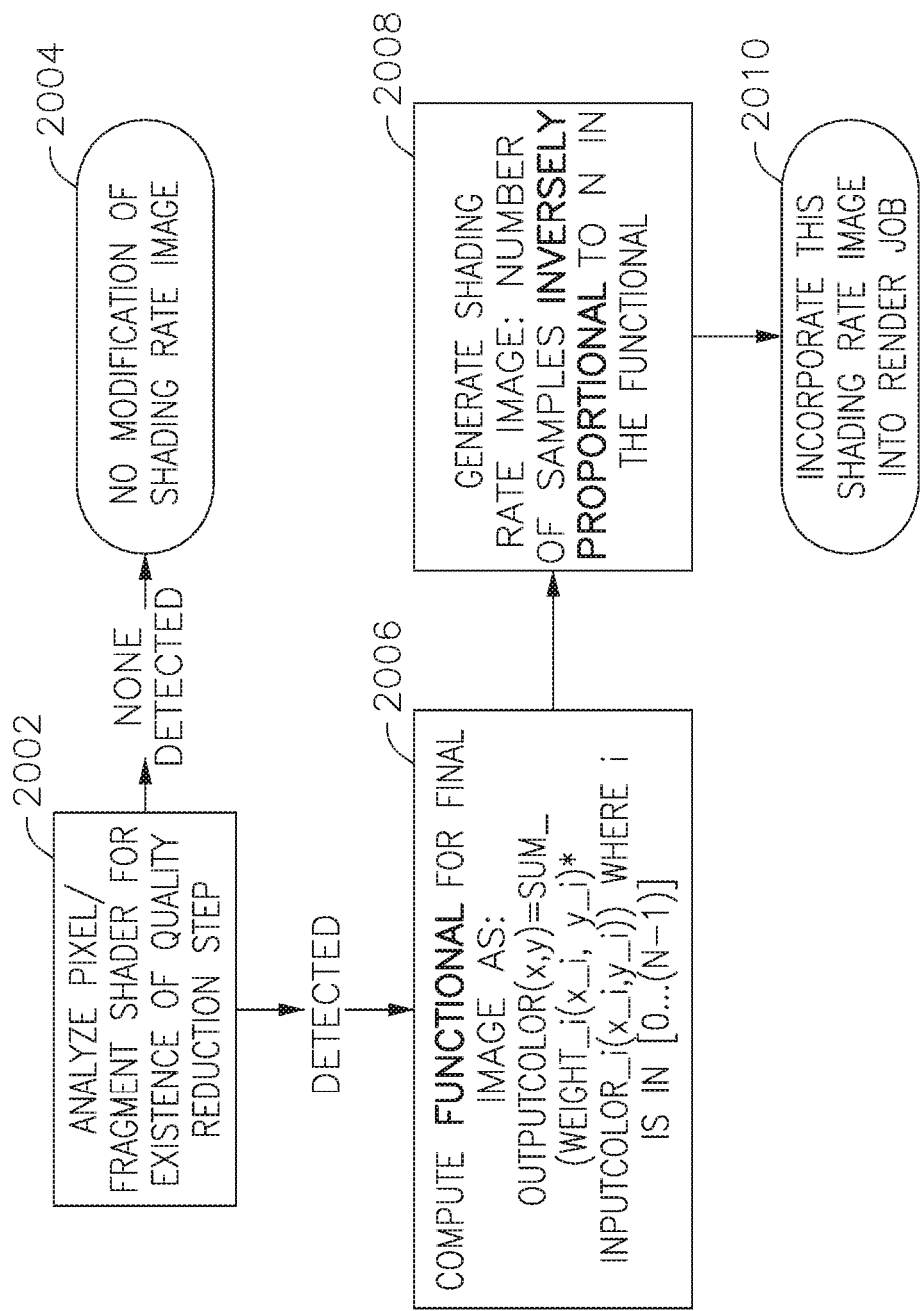

MOTION BASED ADAPTIVE RENDERING

CROSS REFERENCE TO RELATED APPLICATIONS

This application claims priority to and the benefit of U.S. Provisional Patent Application No. 62/863,856, filed Jun. 19, 2019, and further is a continuation-in-part of U.S. patent application Ser. No. 15/913,776, filed Mar. 6, 2018, which is a continuation of U.S. patent application Ser. No. 14/743,700, filed Jun. 18, 2015, now U.S. Pat. No. 9,928,610, which claims priority to and the benefit of U.S. Provisional Patent Application No. 62/018,221, filed Jun. 27, 2014, U.S. Provisional Patent Application No. 62/018,228, filed Jun. 27, 2014, U.S. Provisional Patent Application No. 62/018,254 filed Jun. 27, 2014, and U.S. Provisional Patent Application No. 62/018,274, filed Jun. 27, 2014, the entire contents of all of which are incorporated herein by reference.

FIELD

An embodiment of the present invention is generally related to techniques of performing graphics processing in which the number of samples rendered in a block of pixels is reduced. More particularly, an embodiment of the present invention is directed to automatically analyzing motion and other factors in individual display screen tiles (block of pixels) and making sampling decisions on a tile-by-tile basis.

BACKGROUND

FIG. 1 illustrates major portions of a graphics pipeline 100 based on the OpenGL® 3.0 standard. An illustrative set of stages includes a vertex shader operations stage 105, a primitive assembly and rasterization stage 110, a fragment pixel shader operations stage 115, a frame buffer stage 120, and a texture memory 125. The pipeline operates to receive vertex data, shade vertices, assemble and rasterize primitives, and perform shading operations on fragments/pixels.

One aspect of the graphics pipeline 100 is that every region of an image is rendered at the same minimum resolution. In particular, in a conventional graphics pipeline, a sampling rate (average number of samples per pixel) is typically at least one sample for every pixel of an image.

One aspect of the conventional graphics pipeline is that it is wasteful and requires more pixel shading operations than desired. In particular, there is no automation in the graphics pipeline to permit strategic choices to be automatically made to reduce a sampling rate below one sample per pixel (sub-sampling/de-sampling) in local regions of an image. In the context of mobile devices, this means that the amount of energy that is consumed is higher than desired.

The above information in the Background section is only for enhancement of understanding of the background of the technology and therefore it should not be construed as admission of existence or relevancy of the prior art.

SUMMARY OF THE INVENTION

A graphics system adaptively renders individual portions of a frame based on the motion of the underlying objects being rendered with respect to the camera's frame of reference. In one embodiment, the adaptive rendering is based at least in part on the speed of objects rendered on the screen across at least two frames. Measuring motion in screen space (via pixels) incorporates the different source of motion, including object motion and camera motion. If the speed of the underlying motion is below a quasi-static limit, a decision may be made whether or not to reuse a fraction of pixels from the previous frame. In an intermediate speed regime a full sampling rate is used. In at least one higher speed regime, a decision is made whether to select a reduced sampling rate. The decisions may be made on a tile-by-tile basis, where a tile is a contiguous set of pixels in an image, typically in a block having a square or rectangular shape.

One embodiment of a method includes determining, on a tile-by-tile basis, a speed of pixels of objects in a current frame relative to a previous frame. Each tile is classified into one of at least three speed categories, the at least three categories including a quasi-static speed category, a medium speed category, and a high-speed category. A sampling decision is made for each tile, based at least in part on the speed category associated with each tile. The sampling decision includes deciding whether the tile is to be sampled at a full resolution sampling rate of at least one sample per pixel in the current frame or sampled at a lower rate in the current frame. The tiles are then rendered. In one embodiment, the sampling decision is further based on whether or not a tile is detected to have a strong likelihood of including an edge in color or depth. In one embodiment, for a tile classified in the quasi-static speed category the method further includes reusing pixel data from a previous frame by copying pixel data for the at least one pixel of the previous frame to the tile. In one embodiment, for a tile classified in the intermediate speed regime, every pixel is sampled at least once. In one embodiment, for a tile classified in the at least one high speed regime a selection is made of a sampling pattern in which a number of samples is less than the number of pixels associated with the tile and interpolation is performed to determine a color at pixel locations not sampled.

One embodiment of a graphics system includes a graphics processor and a graphics pipeline including an adaptive sampling generator and pixel shader. The adaptive sampling generator determines a required sample rate for each tile based at least in part on a speed of pixels of objects in each tile and selects a sample pattern based on the required sample rate. In one embodiment, the adaptive sampling generator determines a sample pattern and a sample rate for an individual tile based on a combination of the speed of objects in the individual tile and whether or not the individual tile includes an edge. In one embodiment, the graphics system includes an advection unit to perform advection, wherein for a tile having a velocity below a quasi-static speed limit, a sample pattern having a reduced sampling rate is selected and the advection unit fills in missing pixel data by reusing pixel data from a previous frame via advection. In one embodiment, the graphics system includes a reconstruction unit, wherein for a tile having a velocity above a threshold speed a reduced sampling rate is selected and missing pixel data is interpolated by the reconstruction unit.

In some embodiments, a method of performing adaptive shading of image frames by a graphics processing unit (GPU) includes determining, by the GPU, a first shading rate based on determining that a change in a plurality of underlying assets between a first image frame and a second image frame is above a first threshold; determining, by the GPU, a second shading rate based on determining that one or more viewports in the second image frame is similar to one or more viewports in the first image frame; determining, by the GPU, a third shading rate based on determining that a quality reduction filter is used; and selecting, by the GPU, a shading rate from among the first shading rate, the second shading rate, and the third shading rate for the first image frame.

In some embodiments, the method further includes reusing, by the GPU, pixel data from the first image frame to render the second image frame based on determining that the change in the plurality of underlying assets between the first image frame and the second image frame is below the first threshold. In some embodiments, the method further includes reusing, by the GPU, the pixel data from the first image frame to render the second image frame by reprojecting the pixel data from the first image frame to the second image frame. In some embodiments, the change in the plurality of underlying assets between the first image frame and the second image frame is related to camera and viewport.

In some embodiments, the method further includes reusing, by the GPU, pixel data from the first image frame to render the second image frame based on determining that a change between the one or more viewports in the second image frame and the one or more viewports in the first image frame is below a second threshold, wherein the method further includes reusing, by the GPU, the pixel data from the first image frame to render the second image frame by reprojecting the pixel data from the first image frame to the second image frame.

In some embodiments, determining that the quality reduction filter is used includes determining, by the GPU, a reduction in a quality of the second image frame; determining, by the GPU, if an output color of the second image frame corresponds to a weighted sum of pixel data from the first image frame; and determining, by the GPU, the third shading rate for the first image frame based on determining that the output color of the second image frame corresponds to the weighted sum of the pixel data from the first image frame.

In some embodiments, determining that the output color of the second image frame corresponds to the weighted sum of the pixel data from the first image frame includes determining, by the GPU, a functional for the second image frame. In some embodiments, a proportional relationship between a number of shaded samples in the first image frame and a number of input values to the functional is based on a workload of the GPU. In some embodiments, the functional is configured to receive the quality reduction filter as an input, and determine the third shading rate for the first image frame.

In some embodiments, the weighted sum includes the weighted sum of the pixel data of the first image frame, over a plurality of input image frames of which the first image frame is an instance. In some embodiments, the quality reduction filter includes one or more of a depth-of-field filter, motion blur filter, and a smoothing filter. In some embodiments, the quality reduction filter is configured to average over multiple samples or taps from input textures rendered on the GPU.

In some embodiments, a system for performing adaptive shading of image frames includes a memory; and a graphics processing unit (GPU) coupled to the memory, wherein the GPU is configured to determine, a first shading rate based on determining that a change in a plurality of underlying assets between a first image frame and a second image frame is above a first threshold; determine, a second shading rate based on determining that one or more viewports in the second image frame is similar to one or more viewports in the first image frame; determine, a third shading rate based on determining that a quality reduction filter is used; and select, a shading rate from among the first shading rate, the second shading rate, and the third shading rate for the first image frame.

In some embodiments, the GPU is further configured to reuse pixel data from the first image frame to render the second image frame based on determining that the change in the plurality of underlying assets between the first image frame and the second image frame is below the first threshold. In some embodiments, the GPU is further configured to reuse the pixel data from the first image frame to render the second image frame by reprojecting the pixel data from the first image frame to the second image frame.

In some embodiments, the change in the plurality of underlying assets between the first image frame and the second image frame is related to camera and viewport, wherein the GPU is further configured to reuse pixel data from the first image frame to render the second image frame based on determining that a change between the one or more viewports in the second image frame and the one or more viewports in the first image frame is below a second threshold by reprojecting the pixel data from the first image frame to the second image frame.

In some embodiments, the GPU is further configured to determine, a reduction in a quality of the second image frame; determine, if an output color of the second image frame corresponds to a weighted sum of pixel data from the first image frame; and determine, the third shading rate for the first image frame based on determining that the output color of the second image frame corresponds to the weighted sum of the pixel data from the first image frame, determining that the output color of the second image frame corresponds to the weighted sum of the pixel data from the first image frame includes determining a functional for the second image frame.

In some embodiments, a proportional relationship between a number of shaded samples in the first image frame and a number of input values to the functional is based on a workload of the GPU, wherein the functional is configured to receive the quality reduction filter as an input, and determine the third shading rate for the first image frame.

In some embodiments, a method of performing adaptive shading of image frames by a graphics processing unit (GPU) includes determining, by the GPU, if a quality reduction filter is used by applying one or more heuristics to a pixel shader in the GPU; determining, by the GPU, a functional of a function in the pixel shader based on determining that the quality reduction filter is used in the GPU; determining, by the GPU, a first shading rate of a first image frame based on the functional; and rendering, by the GPU, the first image frame based on the first shading rate. In some embodiments, the rendering the first image frame includes rendering, by the GPU, at least a first portion of the first image frame based on the first shading rate, wherein the first portion of the first image frame is a rendered subset of pixels in the first image frame.

BRIEF DESCRIPTION OF THE DRAWINGS

FIG. 7A illustrates an example of advection in accordance with an embodiment of the present invention.

FIG. 9 illustrates an example of sampling pattern related to considerations for determining pre-computed weights in accordance with an embodiment of the present invention.

FIG. 10 illustrates an example of sampling pattern related to considerations for determining pre-computed weights in accordance with an embodiment of the present invention.

FIG. 14 illustrates an example of differences between advection and spline reconstruction.

FIG. 20 is an example flowchart illustrating a shader analysis method to detect quality reduction in a rendered image and compute shading rate image.

DETAILED DESCRIPTION

Example Graphics Pipeline System Overview

Figure 2:
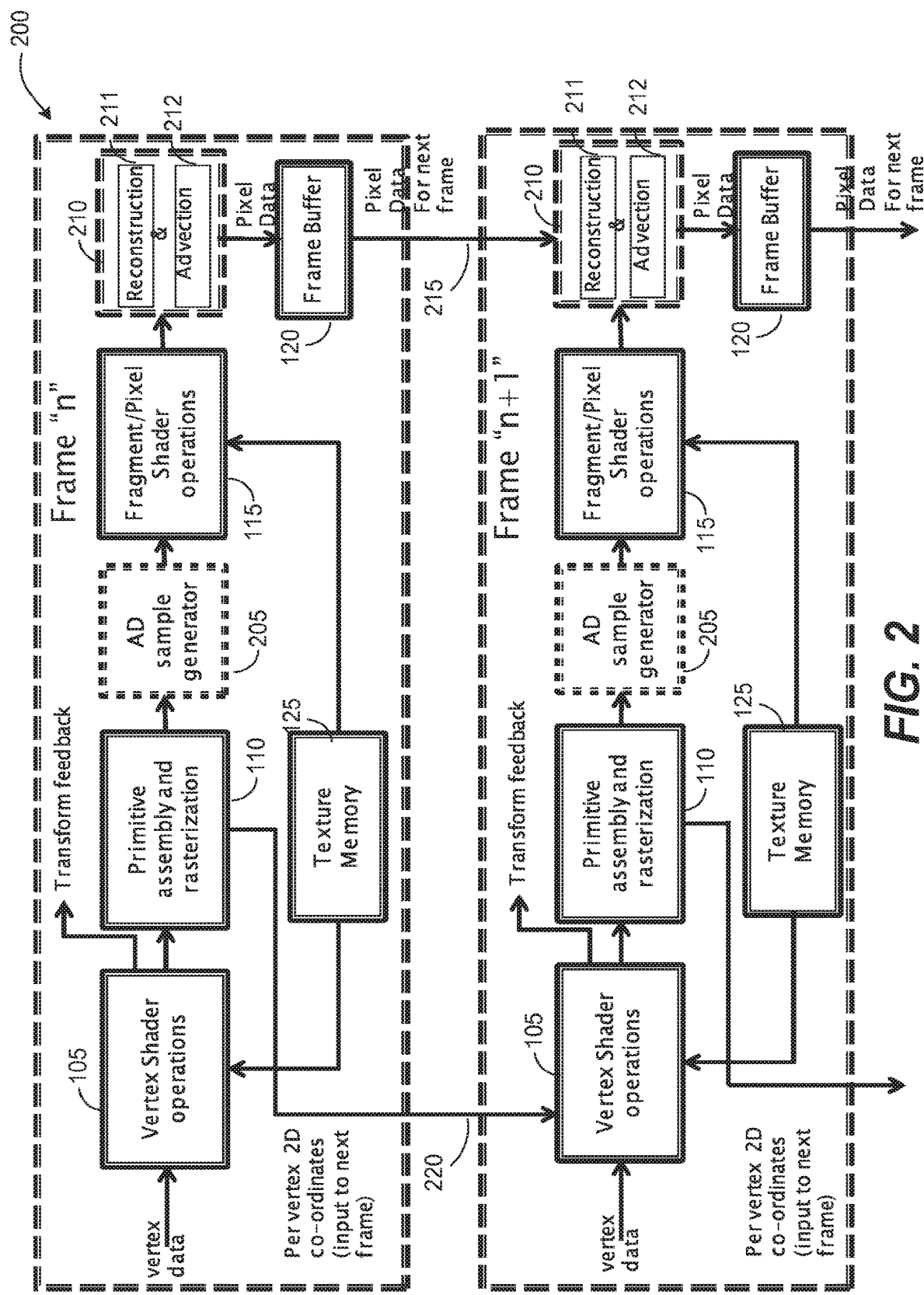
FIG. 2 illustrates a graphics pipeline in accordance with an embodiment of the present invention.

FIG. 2 illustrates a graphics pipeline 200 in accordance with an embodiment of the present invention. The graphics pipeline 200 may be implemented using a graphics processing unit (GPU) including graphics hardware. The graphics pipeline 200 includes several new stages and functions to support automatically determining regions of the frame that do not require all of the pixels in individual tiles (blocks of pixels) to be sampled and rendered in order to achieve an acceptable viewing experience for a human user. As used in this application, a tile is a contiguous set of pixels in an image, typically in block having a square shape. The term frame is commonly used to describe a set of operations performed to render an image that is read by a display at a preset frequency. However, the term frame is also used to refer to the rendered image resulting from the set of operations used to render the image.

In one embodiment, an adaptive desampling (AD) sample generator stage 205 is provided to support adjusting a sampling pattern in local regions of an image, where the local region is a tile corresponding to a block of pixels (e.g., a 4×4 block of pixels, 16×16, or other size). Desampling is the reduction in the number of samples per tile that are sampled and rendered in the current frame. For example, desampling may include sampling and rendering on average less than one sample per pixel in a tile, and thus may also be described as sub-sampling. To maintain full image resolution, two different approaches may be used to obtain values of missing pixel data. A reconstruction and advection stage 210 supports two different options to reduce the number of pixels that need to be sampled and rendered in a tile while maintaining visual quality for a user. The reconstruction and advection stage 210 includes a reconstruction submodule 211 and an advection submodule 212. In one embodiment, a first option to reduce the number of pixels rendered in a tile is reconstruction via higher order polynomial interpolation and filtering in a tile to generate missing pixel data for that tile. A second option to reduce the number of pixels rendered in a tile is advection, which includes identifying locations of one or more pixels in a previous frame and reusing pixels from the previous frame for a selected fraction of pixels in the tile.

In one embodiment, pixel data of frame "n" 215 of objects from frame n 220 is saved for possible reuse of pixel data in the next frame "n+1." Additionally, vertex coordinate data is saved for use in determining a frame-to-frame motion vector of pixels. In one embodiment, the pixel data and vertex coordinates from frame n are stored in a buffer memory for use in the next frame n+1.

Figure 3:
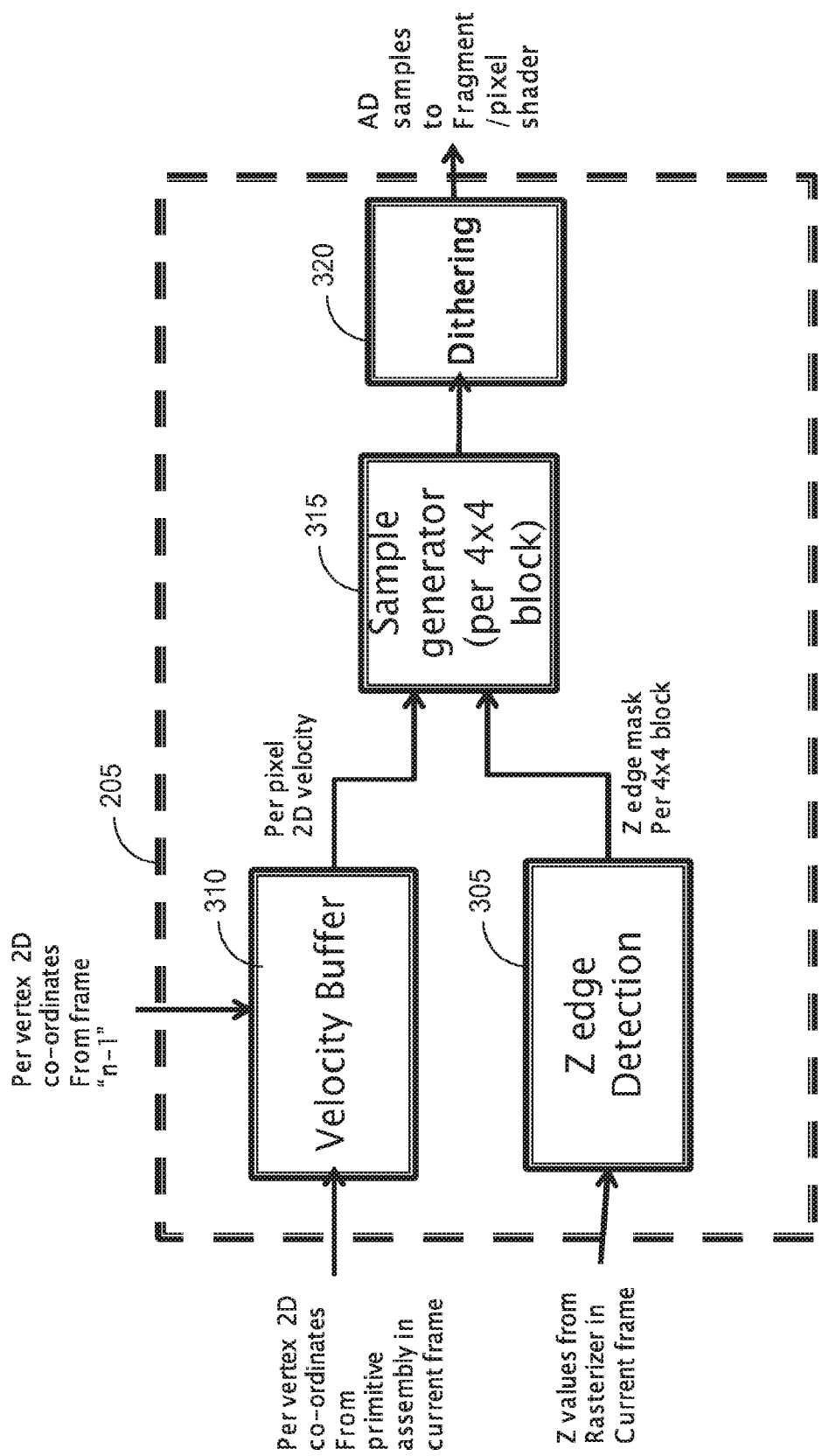
FIG. 3 illustrates an adaptive desampling generator in accordance with an embodiment of the present invention.

FIG. 3 illustrates an AD sample stage 205 in accordance with an embodiment of the present invention. In one embodiment, desampling decisions are made in local tile regions based on velocity and edge detection (e.g., edge detection in depth/Z). A velocity buffer 310 receives the per vertex coordinates from the current fame and from the previous frame. The velocity of an individual pixel may be determined by comparing the vertex coordinates of the pixel of the current frame with the vertex coordinates of the pixel in the previous frame. In one embodiment, a forward splatting approach is used by rendering a "velocity image" with primitives from the scene, and using a per-vertex velocity as a vertex attribute. Many graphics applications render a Z-buffer as a technique to reduce the number of pixel shader instances during rendering passes. A velocity buffer/image may be rendered with a Z-buffer. During the Z-pass, where the Z/depth buffer is generated, in addition to splatting and updating the depth, the velocity is also updated at each pixel. Rendering the velocity buffer results in per-pixel velocity values in screen space, the magnitude of which corresponds to a speed. A tile, such as a 4×4 tile, thus has a pixel speed associated with each pixel. The tile thus has a maximum pixel speed, mean pixel speed, median pixel speed, and minimum pixel speed. In one embodiment, the mean pixel speed is used to make desampling decisions, although more generally the maximum pixel speed or average pixel speed could also be used.

Visual artifacts are less perceptible to the human eye in moving objects. Thus, one factor in whether or not a sampling rate may be reduced in a tile is whether the speed is above a threshold speed.

However, certain types of visual artifacts tend to be more noticeable in edges in color. Strictly speaking, detecting color edges in a final image is not possible without rendering the image first. However, it is possible to detect, prior to rendering, a high likelihood of edges in color. Thus, in one embodiment, an edge detection module 305 detects the likelihood of edges in color in local blocks of pixels. That is, regions are detected in which there is a high likelihood of edges in color by assuming that there is a high likelihood of color variation across objects. In one embodiment, Z values from the rasterization of the current frame are analyzed to perform edge detection. A Laplace edge detector may be defined as stencil centered on a current pixel. Any pixel in the tile is marked as having an edge if the Laplacian of the z-buffer at the pixel is greater than a threshold value multiplied by the z-value at the pixel. This defines a one bit value per tile. More generally, any type of edge detection may be used.

In one embodiment, an edge mask is generated for individual tile and an edge state bit may be generated to indicate whether or not a tile includes at least one edge. In one implementation the edge mask is generated for each 4×4 block of pixels although more generally other tile sizes may be used. This information on velocity and the presence of an edge is used by a sample generator 315 to determine a sample pattern for a tile. In one embodiment, a full sampling resolution is utilized if an edge is detected. If no edge is detected and a tile has a speed greater than a first threshold speed a first reduced sampling rate is used. If no edge is detected and a tile has a speed above a second threshold speed a second reduced sampling rate is used. Other additional optional factors could also be considered in making a sampling rate decision. In one embodiment, the sample pattern options include full sample resolution (at least one sample per pixel), one-half resolution (one-half of the pixels sampled in each tile), and one-quarter resolution (one in four pixels sampled in each tile). More generally, a plurality of sampling rates may be provided that are controlled by threshold parameters for each sample rate. Additionally, the sample rates selected may be optimized for the block/tile size selected. Thus, while an illustrative example includes three sample rates of 4, 8, and 16 samples for 4×4 blocks, the approach may be varied based on block size or other considerations to have a set of sampling rates each controlled by threshold parameters for each sample rate. Thus, the number of sampling rates, N, may be more than three, depending on implementation details, such as block/tile size and other factors.

In one embodiment, a dithering module 320 is provided to adjust the sampling pattern from a selection of sampling patterns having the same effective sampling rate. The dithering may be a repetitive sequence (e.g., sample pattern 1, sample pattern 2, sample pattern 3, sample pattern 4) or include aspects of randomization.

The dithering of the sampling pattern by the dithering module 320 reduces the visual perception of sampling artifacts by human users. The human eye and the human brain start to blend images into a video sequence when the rate is faster than a biological threshold. That is, when images vary at a rate faster than a biological threshold, the human eye blends the images across time and perceives them as a continuously varying sequence, akin to a video. There is some contention about what the exact number of the biological threshold is. At frame rates of about 12 frames per second, the human eye and brain begins to see a sequence of images that is moving instead of individual images. However, somewhat higher frame rates of about 15 frames per second are required to experience the beginnings of relatively fluid (non-jerky) movement. However, the nature of the underlying images is also an additional factor for whether or not a human observer perceives a fluid motion at a given frame rate. Thus, the human eye will tend to average out visual artifacts that are dithered at frames rates at about 12 frames per second and higher. In one embodiment, the dithering is performed such that every pixel is rendered at least fifteen frames per second, which is faster than the human eye can discern individual images. At 60 frames per second, dithering the sample pattern in a tile every four frames corresponds to rendering each pixel at least fifteen frames per second.

Exemplary Motion Speed Regimes

Figure 4:
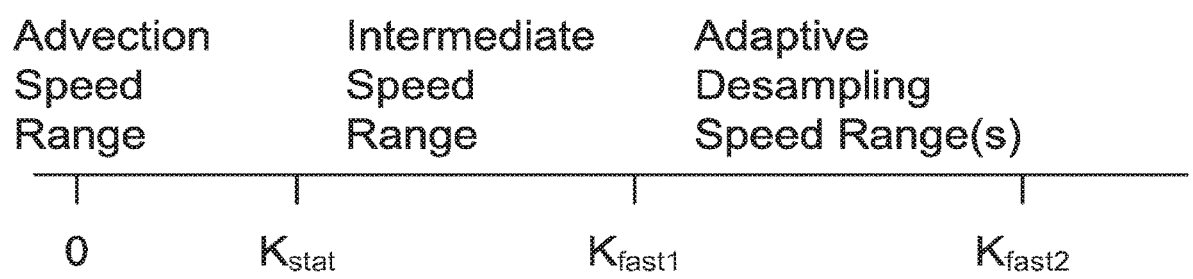
FIG. 4 illustrates an example of pixel speed considerations in performing adaptive rendering in accordance with an embodiment of the present invention.

FIG. 4 illustrates examples of speed regimes in accordance with an embodiment of the present invention. The motion is the combination of object motion and camera motion. The speed corresponds to the magnitude of the motion vector in a tile. In this example, the speed is an indicator of the number of samples needed in a block of pixels to have an acceptable visual quality. If the motion above a certain threshold speed Kfast1 for a block of pixels, it is an indication that the number of samples may be decreased (e.g., eight samples in a 4×4 tile) because the human eye cannot perceive the high frequencies in a moving object. If the speed is above an even higher threshold speed Kfast2, it is an indicator that the number of samples in a tile may be reduced even further (e.g., four samples in a 4×4 tile). On the other hand, if the motion is very slow in a tile, below a speed Kstat (or if there is no motion), then there may be an opportunity to reuse pixel data from the previous frame (e.g., render eight samples in a 4×4 tile and reuse eight color values from the previous frame via advection). The reuse of pixel data from the previous frame also requires that the graphics state does not change from the previous frame to the current frame, where the graphics state includes the shaders used, the constants provided to the shaders, and the geometry provided to the frames. There will be a speed regime where full sampling resolution is required. As an example, there may be an intermediate speed regime between Kstat, and Kfast1 in which a full sampling resolution is required to achieve a high visual quality. Additionally, there may be scenarios in which super-sampling is applied to individual tiles. As an illustrative example, an option may be provided to support super-sampling of a Z-edge case.

In one embodiment, desampling (changing the sample pattern to reduce the sampling rate below one sample per pixel) is permitted if the speed is above a first threshold speed $K_{fast1}$. In one embodiment, the sampling rate is permitted to be reduced further if the speed exceeds a second threshold speed $K_{fast2}$. A decision whether to perform desampling may also be dependent on other conditions, such as whether or not an edge is detected.

In one embodiment, motion in the camera screen space is obtained by differencing vertex position data from the current frame and the previous frame. A speed regime of a tile is classified on a tile-by-tile basis by calculating a magnitude of a motion vector based on how much a pixel of an object has moved from one frame to another. As previously discussed, in one embodiment, splatting is used in the Z-pass to determine per-pixel motion vectors. In one embodiment, speed thresholds are defined and used as inputs to make decisions on whether adaptive desampling or advection are to be used for a current frame. One speed regime is a quasi-static regime in which an object moves slowly enough that pixels of the object are unlikely to differ significantly from their previous image counterparts. If the speed is within the quasi static speed limit, a decision may be made whether advection may be used to reuse pixels from a previous frame. In one embodiment, an upper bound on a quasi-static speed, $K_{stat}$ is that a pixel in a given tile (tile m) in frame n remains in the same tile in frame n+1. In one embodiment, if the speed is below $K_{stat}$, additional checks are performed to determine if pixels from the previous frame may be used in the current frame. This may include a check that advection produced an acceptable result in a previous frame. Additionally, a check may be performed to check that the pixel values for the tile in the current frame are consistent with a small movement over the previous frame, which may be described as a discrepancy check. An advection discrepancy state bit may be associated with a tile to indicate that it has passed one or more discrepancy checks to confirm that the tile is suitable for advection of at least some of the pixel data.

Figure 5:
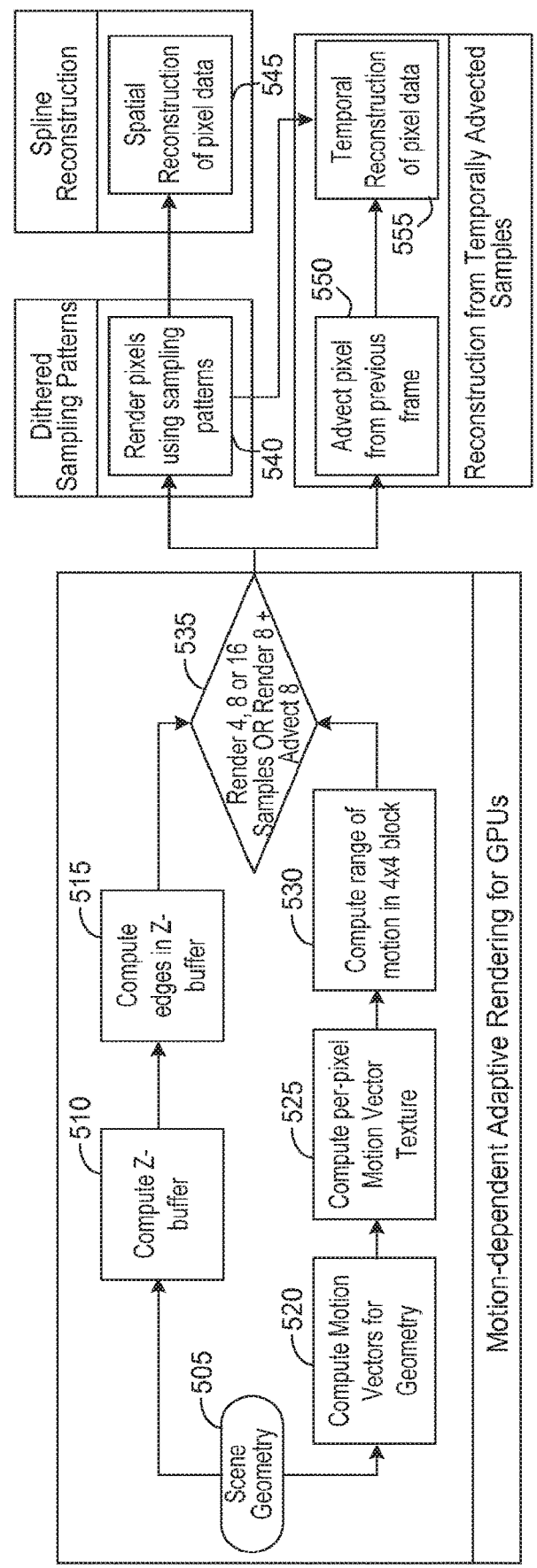
FIG. 5 is a flow chart illustrating rendering and reconstruction options in accordance with an embodiment of the present invention.

FIG. 5 is a flowchart illustrating an example of adaptive rendering choices based on speed, edge detection, dithering, spline reconstruction and advection. Some conventional graphics pipeline features are omitted for clarity. FIG. 5 illustrates a specific example in which 4×4 tiles are used in accordance with an embodiment of the present invention. An initial pre-pass may be performed followed by a color pass to render pixel data. The scene geometry 505 of an image is provided by the application. The Z-buffer is computed 510 and edge detection is performed 515. Motion vectors are computed 520 for the scene geometry. The per-pixel motion vector is computed 525. The range of motion in a tile is computed 530. Based upon this information, a decision 535 is made whether to: 1) render 4, 8, or 16 samples in a 4×4 block and perform interpolation or 2) to render 8 and advect 8. Dithering 540 is performed for the sampling patterns. Spline reconstruction 545 is utilized to reconstruct pixel data. If advection is used, then advection 550 is used to obtain 8 of the pixel values and the rest are obtained by rendering.

Exemplary Sampling Patterns and Dithering

Figure 6A:
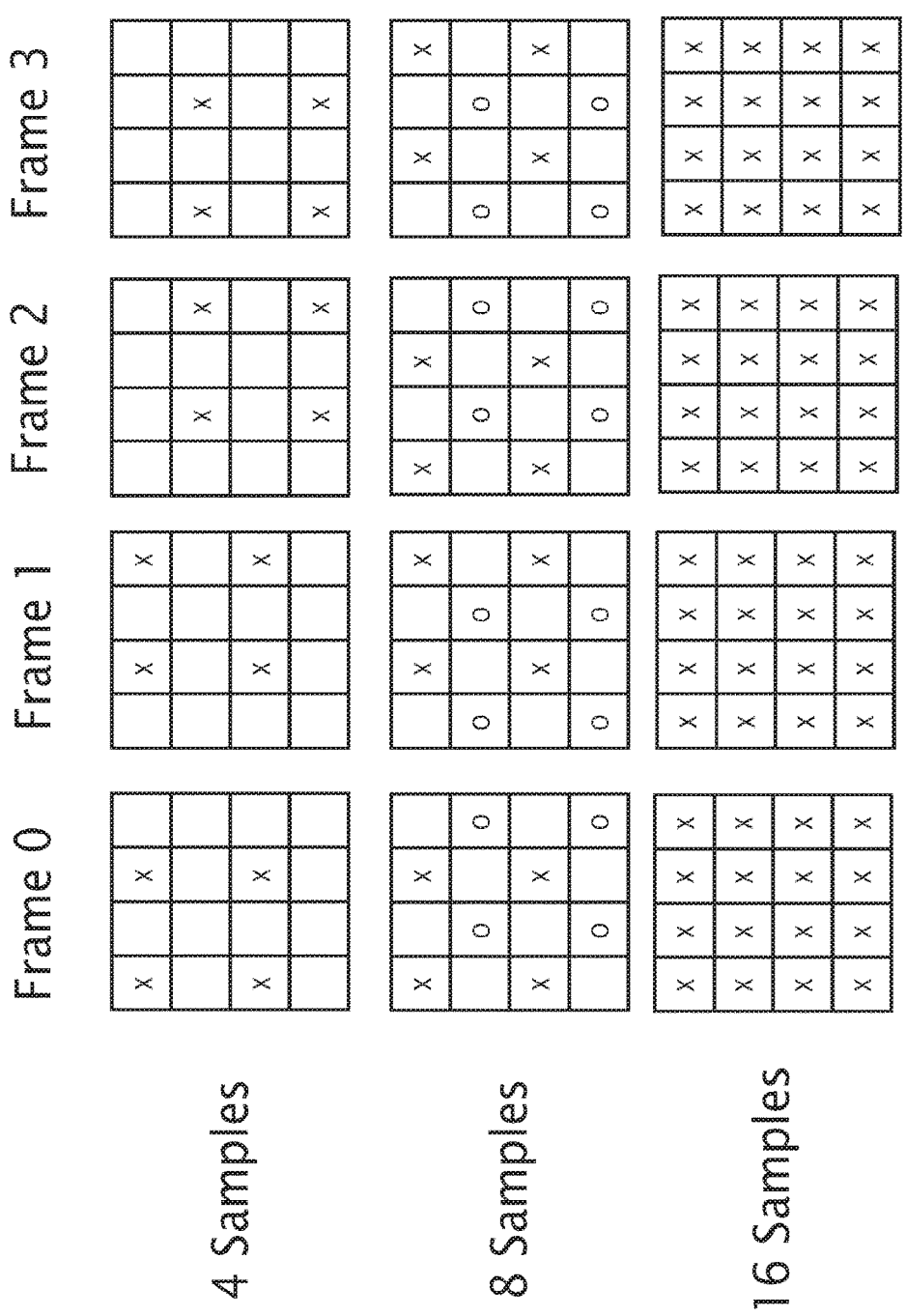
FIG. 6A illustrates an example of dithering sampling patterns to reduce visual artifacts in accordance with an embodiment of the present invention.

FIG. 6A illustrates an example of sampling patterns and dithering. In this example the tile size is a 4×4 block of pixels. Full resolution corresponds to 16 samples. Half-resolution (8 samples) and one-quarter resolution (four samples) permits variations in the pattern of the samples. Thus, for the case of 8 samples, the arrangement of the samples can have a first sample pattern, second sample pattern, third sample pattern, etc. Having pre-defined sampling patterns supports dithering of the sample pattern for temporal color averaging. The pre-defined sampling patterns are selected to rotate the sampling so that every pixel location is rendered once every few frames. The dithering of the sample pattern can be achieved by different techniques. In one embodiment, the choice of sample pattern in an individual frame can be selected by the dithering module 320 in a sequence by a modulo k counter. Dithering sample positions in time over multiple frames makes rendering errors harder for a human observer to see. In one embodiment, the sample patterns are selected so that each pixel is guaranteed to be rendered at least once every k frames, where (n*n)/k is the minimum number of samples per n×n tile. In another embodiment, temporal dithering is implemented using a stochastic approach to select the sample pattern.

Figure 6B:
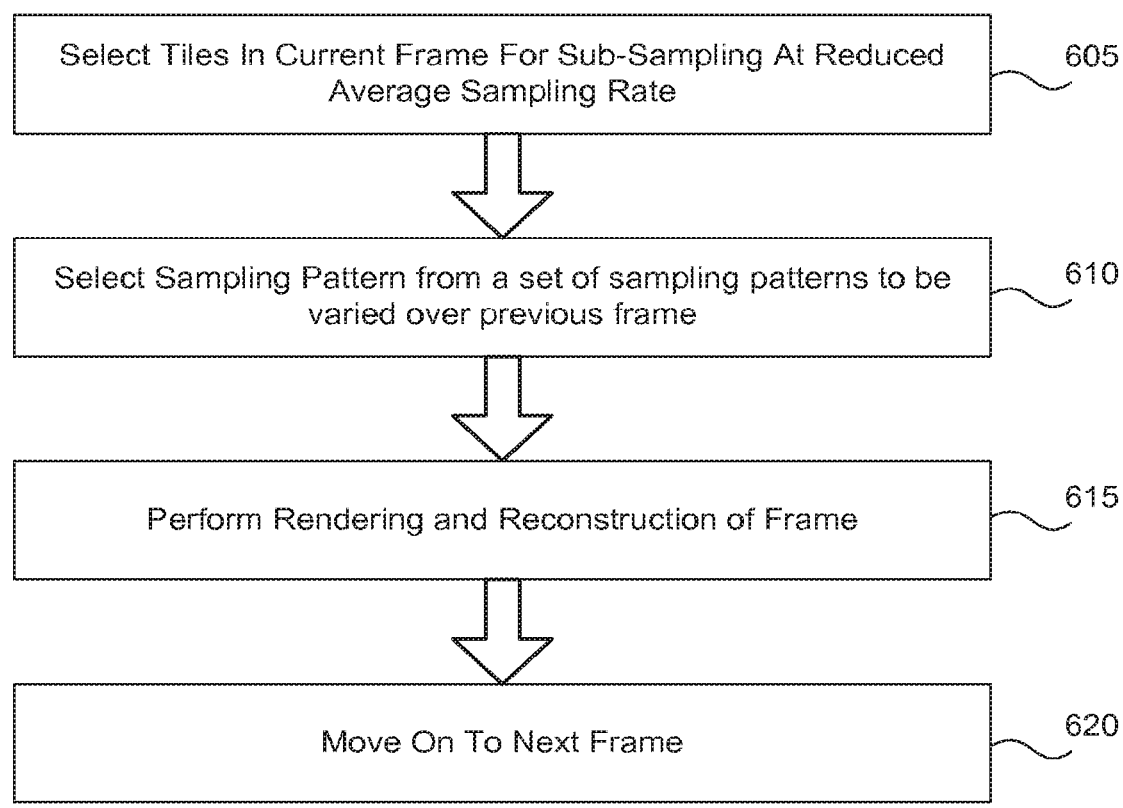
FIG. 6B illustrates a general method of performing dithering of sample patterns in accordance with an embodiment of the present invention.

FIG. 6B illustrates a method of dithering in accordance with an embodiment of the present invention. Tiles in a current frame are selected 605 for sub-sampling at a reduced average sampling rate. For each tile, a sampling pattern is selected 610 to be varied over the previous frame. Rendering and reconstruction is performed 615. If additional frames are to be rendered, the process continues.

Advection Example

FIG. 7A illustrates an example of advection. In a tile region, such as a 4×4 tile 700, advection including copying pixel data from pixel at a given location in the previous frame to the corresponding location in the current frame. For example, an individual object (e.g., a ball slowly moving across the ground) may move across the screen such that every pixel of the ball moves with a velocity. In this example there is a high level of temporal coherence between the pixels of the slowly moving ball from one frame to another. In this case, the changes are primarily motion. By determining the motion of individual pixels of the ball across frames, pixel data may be copied across frames. In this example, the motion is slow enough that pixel data can be mapped from a current pixel location to a pixel in the same tile in a previous frame. The position of a pixel in a previous frame may be computed as $x(n-1)=x-mv(x)$, where $mv(x)$ is the motion vector. As a result this permits pixel data to be copied from $x(n-1)$ to $x(n)$. That is, if the motion of the pixel is small between frames then the pixel location in the current frame may be projected back to a pixel in the previous frame and the pixel data from the previous frame copied. Bilinear or any higher order interpolation may be used if $x(n-1)$ has decimal components.

In the example of FIG. 7A, advection is mixed with rendering. In one embodiment, advection is used for half of the pixels 705 in a tile and the other half of the pixels are rendered 710. Mixing advection and rendering in a single frame reduces visual artifacts associated with performing only advection. That is, it minimizes the likelihood of visual errors due to advection detectable by typical human viewers. In conjunction with temporal dithering, it ensures that errors do not accumulate over time, thus reducing the likelihood of visual errors being noticed by typical human viewers. While a 1:1 ratio of rendered pixels and advected pixels is one option, more generally other ratios could be utilized.

As previously discussed, in one embodiment, a maximum speed is used as condition for whether advection is permitted. In one embodiment, the criteria is that the threshold speed is low enough that local deformation of pixel positions in a small neighborhood can be classified as a rigid transformation in which the change in the positions of the pixels can be represented using one of translation and rotation for an entire set of pixels to within a desired accuracy. For example, the maximum speed for advection can be that the magnitude of the pixel motion is below a threshold of k pixels. While it is possible that rigid transforms can occur at any speed, the likelihood decreases with increasing speed such that a speed threshold may be used as a criterion for when advection is likely to be beneficial. A discrepancy check may be performed for individual tiles to determine whether or not advection produces acceptable results. This discrepancy check can be performed in a current frame and written out as 1-bit value for each tile to let the next frame make a determination whether or not to disable advection in the neighborhood of a tile failing the discrepancy check if the check indicates that the advected results were inaccurate. That is, in this implementation advection is performed for a tile in frame n and the discrepancy check is performed in frame n and consumed by frame n+1. Frame n+1 then uses the discrepancy check (computed in frame n) to determine whether or not to perform advection in a neighborhood about a tile in frame n+1. If the discrepancy check in frame n indicates the advection result was acceptable, advection is allowed in frame n+1. If not, the advection is turned off for a selected number of frames. The discrepancy check is a check based on whether or not there is a significant change in pixel values of a tile inconsistent with the underlying assumptions of valid advection. If the pixels of an object are slowly moving then a tile is not expected to change significantly between two frames. Thus, if the state of the tile changes significantly the discrepancy check fails. A tile state discrepancy bit (e.g., 0 or 1) may be used to indicate whether the discrepancy check passes. The degree to which changes in tile state are permitted may be determined empirically or heuristically based, for example, in the tradeoffs between the computational benefits of advection and minimizing the appearance of visual artifacts.

Other ways of performing discrepancy checks may be utilized. There are computational benefits to performing advection in a tile of current frame n, performing a discrepancy check, and then utilizing the discrepancy check to determine whether or not to perform advection in frame n+1. However, it will be understood that an alternate implementation of the discrepancy check may be utilized in which the discrepancy check is performed in frame n and used to determine whether or not to utilize advection in frame n to reuse pixels from the previous frame.

The accuracy can be improved, if desired, using various enhancements. In one embodiment, back and forth error correction and compensation (BFECC) is used. BFECC utilized the position determined from Semi-Lagrangian advection and adds the velocity at that coordinate to obtain a new position in the current frame. If there is no error, this coordinate should be the same as the original position (x, y). Otherwise by subtracting half of this error from (x−vx, y−vy) the second-order accurate estimate of the position is obtained, which is accurate to half a pixel, assuming that the velocity of pixel is accurate.

Figure 7B:
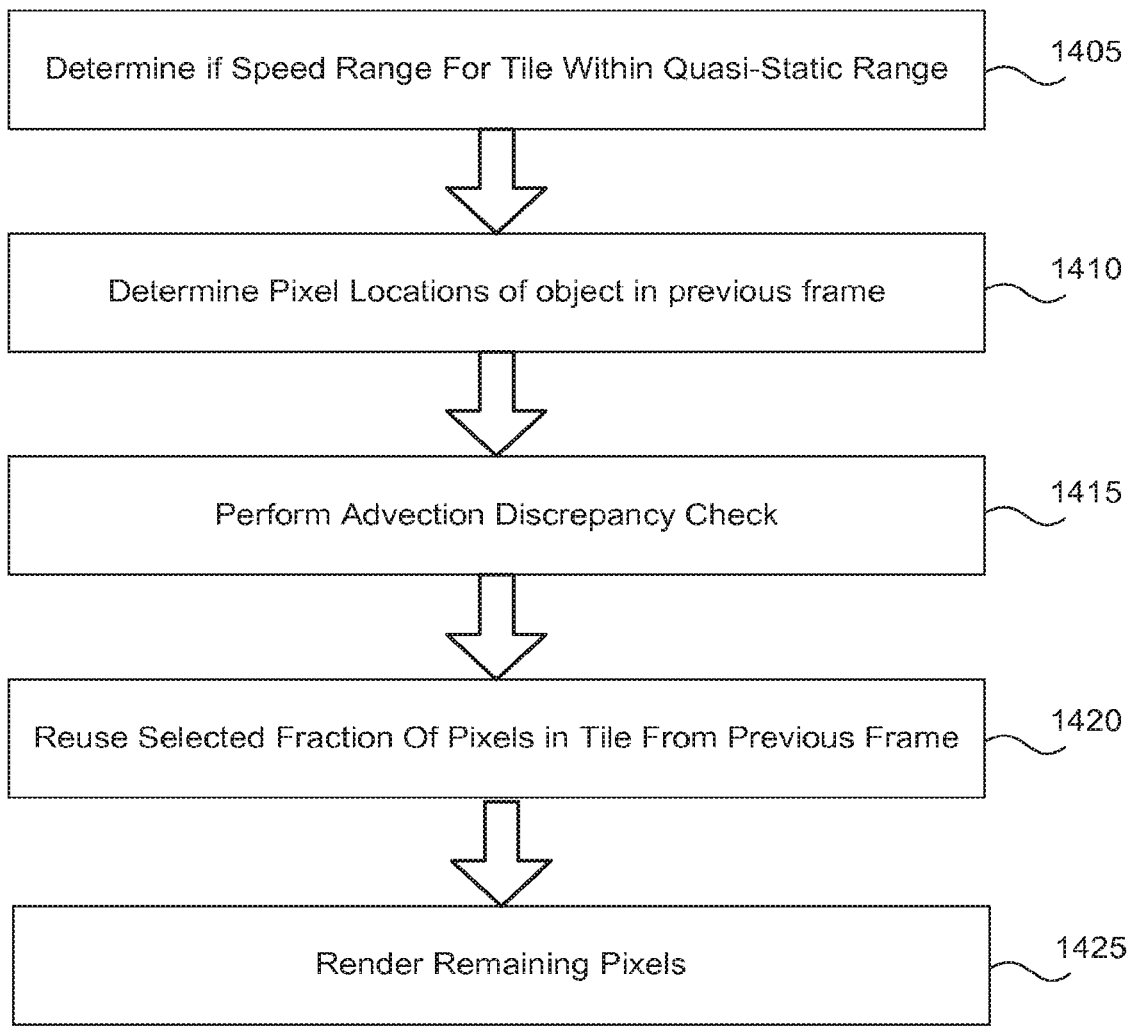
FIG. 7B illustrates a general method of performing advection in a graphics system in accordance with an embodiment of the present invention.

FIG. 7B illustrates a general method of performing advection in accordance with an embodiment of the present invention. A determination is made 1405 if the tile is suitable for advection. The suitability is based on whether the speed range is within the quasi-static range, augmented by passing any additional discrepancy checks. If the tile is suitable for advection, then a determination is made in block 1410 of corresponding pixel locations in the previous frame. A selected fraction of pixels are reused 1420 from a tile of a previous fame. The remaining pixels are rendered 1425.

Image Interpolation and Reconstruction Examples

Figure 8:
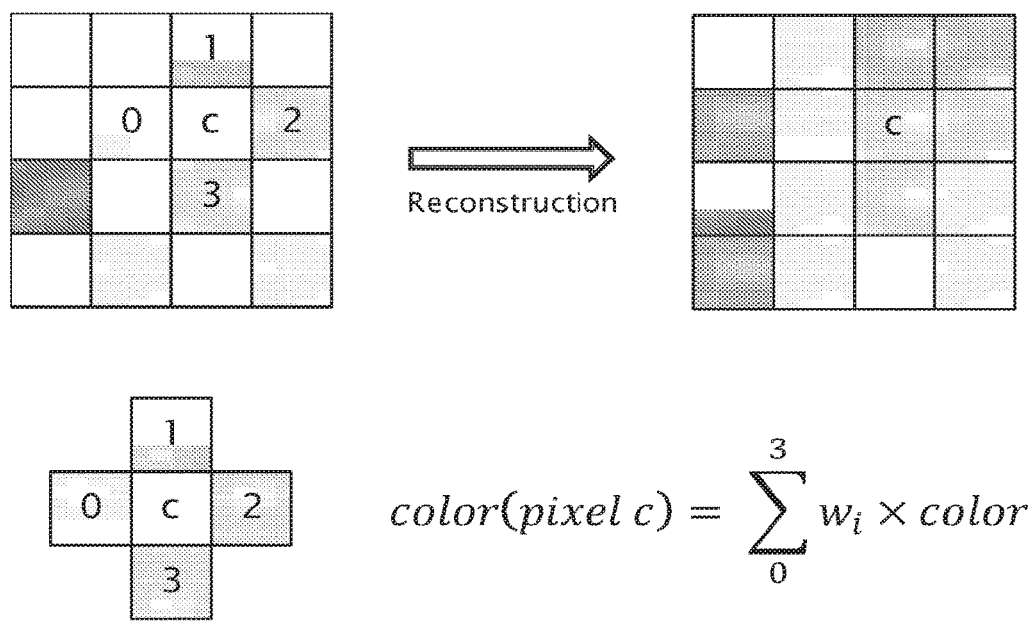
FIG. 8 illustrates an example of using pre-computed weights to perform cubic spline interpolation in accordance with an embodiment of the present invention.

FIG. 8 illustrates an example of image interpolation and reconstruction of pixel color values for the situation of desampling. In one embodiment, a weighted summation of color values is used to reconstruct unrendered pixels. For a given choice of the weight function w, a normalized set of weights can be precomputed for each configuration of pixels arising from a particular sampling pattern. For example, if 4 pixels are rendered in a 4×4 block, the remaining 12 pixels can be expressed using a weighted sum of rendered pixels within the same block, as well as its neighboring blocks. In addition, since the set of possible pixel configurations in the neighboring blocks is restricted by the set of sampling patterns, for this case, all possible weight sets can be precomputed.

Traditionally, a GPU utilizes bilinear interpolation. However, bilinear interpolation has various drawbacks. In one embodiment higher order polynomials having an order of at least three, such as piece-wise cubic polynomials (also known as cubic splines), are used for efficient reconstruction of sparse samples.

Higher order polynomials, such as cubic splines, are capable of mapping a larger frequency spectrum than bilinear interpolation and provide a greater fidelity of data reconstructed from sub-sampled blocks. Additionally, when using bilinear interpolation, samples are preferred on both sides of a pixel, as one-sided linear extrapolation is likely to be inaccurate, as well as exceed the color spectrum range. In contrast, higher-order polynomials using a wider support (>1 pixel away) are more likely to accurately approximate the functional form of rendered image data. While a variety of higher order polynomials could be used, a cubic spline has continuity characteristics that are superior to those of quadratic polynomials. Owing to the edge-detection step performed before desampling, a tile undergoing reconstruction is unlikely to have sharp discontinuities, where higher-order polynomial reconstruction may perform poorly.

One aspect of performing sub-sampling is that there is a sparse sample data at runtime. In an individual block region, such as a k×k pixel region, desampling may result in a subset of pixels being rendered, such as four or eight pixels from a 4×4 block of pixels. The missing pixel data needs to be reconstructed. A consequence of having predetermined sample patterns is that there is a finite set of possible sample locations. This permits a fixed set of local stencils to be created prior to run time, stored, and used to reconstruct pixel data using cubic splines or other higher order polynomials. Conventional approaches to evaluating higher order polynomials in hardware are computationally expensive. In contrast, in embodiments of the present invention the use of a fixed set of pre-computed stencils eliminates the computational overhead, during runtime, of performing a conventional higher order polynomial evaluation. The use of a static set of samples allows the determination of possible configurations of pixels that may need to be reconstructed, and thus the stencils that are required may be pre-computed.

In one embodiment, the higher order polynomial interpolation is implemented as static stencil operations using pre-computed weights. In one embodiment, a table of stencils is stored and made available for spatial reconstruction to a reconstruction submodule 211 of the reconstruction and advection stage 210. The table of stencils provides weights based on known sample positions. In one embodiment, the table of stencils has all of the stencil weights pre-computed for each pixel location within a defined sample pattern. The pre-computed weights permit the higher order polynomial reconstruction to be performed using static stencil operations.

In one embodiment, a set of 5×5 stencils is determined for all possible pixel locations in a tile (e.g., a 4×4 tile) that may need to be interpolated during runtime. Each 5×5 stencil is computed for each pixel location and neighbor configuration. Each stencil provides a list of weight values and corresponding locations of sample points. The stencils are stored in a constant memory table available for reconstruction purposes to the reconstruction submodule 211 of reconstruction and advection stage 210. In one embodiment, at run-time, for each pixel that must be interpolated, an index is computed into this table using the pixel coordinates and sampling mask. In one implementation each stencil is addressed using: (a) the pixel's location within a tile, and (b) the sampling mask used for rendering. Thus, if dithering is employed, the stencil that is selected will depend on which sample pattern is selected for a given degree of subsampling.

In one embodiment, the higher order polynomial interpolation is performed using a multiplier/adder to accumulate the products of weights and sample color values. The accumulated value is then normalized by division, which in many cases can be performed by a bit shift for integer formats, or by subtraction for floating point formats. Thus, the use of stencils with pre-computed weights permits the higher order polynomial interpolation to be calculated at run time with comparatively little computational effort.

An example of a cubic spline functions used for reconstruction and to compute pixel color values as a weighted sum of known pixel color values is as follows:

In one embodiment, a formula expressing a weighted sum to determine a pixel color value is based weights w( ) as follows:

$$c(i, j) = \frac{\sum_{\{a,b\} \in Filled} w(i-a, j-b) c(a, b)}{\sum_{\{a,b\} \in Filled} w(i-a, j-b)}$$

Where c (i, j) is the color value at pixel location (i, j), w( ) is the two dimensional spline function and "Filled" is the set of pixels that were rendered. The two-dimensional spline function is the product of two one-dimensional spline functions or w(i,j)=k(i)k(j), where the one dimensional spline function k( ) is based on the cubic filter formula described in the paper by Don P. Mitchell and Arun N. Netravali, "Reconstruction Filters in Computer Graphics," Computer Graphics, Volume 22, Number 4, August 1988, pp. 221-228:

$$k(x) = \frac{1}{6} \begin{cases} (12 - 9B - 6c)|x|^3 + \\ (-18 + 12B + 6C)|x|^2 + (6 - 2B) & \text{if } |x| < 1 \\ (-B - 6C)|x|^3 + (6B + 30C)|x|^2 + \\ (-12B - 48C)|x| + (8B + 24C) & \text{if } 1 \leq |x| \leq 2 \\ 0 & \text{otherwise} \end{cases}$$

The distances in the Mitchell and Netravali paper are defined in a scaled pixel space:

$B = C = \frac{1}{3}$

By restricting the relative positioning of sample points, the weights and denominators can be pre-computed into stencils. Because the spline function is defined in a bounded fashion, scaling of the magnitude of x can be used to extend the functions to a desired support radius, such as a 2 pixel support radius.

For a tile of size n×n, it is possible to arrange a k×k square in (n/k)*(n/k) possible configurations. A sampling rate of 4*s requires s squares, leading to (n*n)/(k*k*s) sampling patterns.

FIG. 9 illustrates an example of sampling pattern in a 4×4 tile in which the Xs mark rendered samples and the O marks an interpolation location. A 5×5 stencil is used that is centered at O. Assuming any access outside this 4×4 tile is invalid, the stencil has 0 weights for any locations outside the 4×4 tile, which are removed from the stencil table. Assuming the top left pixel to be (0, 0), the table entry then reads the locations required as (0, 0), (2, 0), (0, 2), (2, 2), with appropriate weights w0, w1, w2, w3, and the normalization factor w. The weighted summation can then be computed as 1/w (w0*c(0, 0)+w1*c(2, 0)+w2*c(0, 2)+w3*c (2, 2)) for each color component by using a multiply-and-accumulate operation. However, more generally, the reconstruction is not limited to one tile but a region of influence of a stencil may extend to neighboring 4×4 blocks as well.

Assuming a 5×5 stencil, there are 24 values in all to be pre-computed (the center is always 0 since the pixel itself has no color value). Of those, at most half can be rendered if 8 samples are used per 4×4 tile, leaving 12 values. In one embodiment, each stencil is implemented to include a 4-bit count of the number of non-zero weights, followed by 8-bit weights stored in one chunk, followed by 2 chunks of 3-bit coordinate offsets for the x and y coordinates relative to the center.

In one embodiment, the stencils are stored in order of the sampling patterns. In one embodiment the different sampling patterns for the same sampling rate are rotations of each other, so there are two sets of patterns. These can be stored in row major order within a 4×4 the, with an index list to point to the data for pixel (i, j). For rotations of the sampling mask, the coordinates are transformed appropriately.

Referring to FIG. 10, consider the case of a 4×4 tile of pixels, in which 8 samples out of the possible 16 are rendered. In this example, stencils are defined for each unknown pixel given the weight function. These stencils can be retrieved at runtime from a pre-defined set of stencils. For the example case of cubic stencils with a support radius of 2 pixels, these stencils would be of size 5×5 if no super-sampling is performed. If it is essential to restrict accesses to a k×k tile region, the stencils can be modified appropriately to have 0 weights for such pixels which fall outside the tile. It is important to note that the number of samples does not need to be less than the number of pixels. In regions where super-sampling is desired for anti-aliasing, the number of samples may exceed the number of pixels, e.g. 32 samples for a 16 pixel 4×4 tile. Appropriate pre-computed stencils would be added for those cases.

In one embodiment, each sampling pattern is defined as combination of sparse square patterns (e.g., four samples to be rendered in a square pattern). Selecting square patterns is useful in applications in which groups of four pixels (quads) are a default unit of processing. However, more generally other arrangements of sampling positions could be used in the sampling patterns. In one embodiment, the sample patterns are squares of size 3×3 within a 4×4 tiles. Thus, adjacent vertices are 2 pixels apart along each axis.

In one embodiment, the same sampling pattern is used for all regions of an individual frame that are sub-sampled at a given sampling rate. In this embodiment, the same sampling pattern is used in all of the tiles sub-sampled at a given sample rate because this results in consistent spacing of sample positions within every frame, simplifying reconstruction routines.

In one embodiment, the sampling patterns are based on quads to exploit Single instruction multiple data (SIMD) processing units. Consistent spacing of samples provides robust interpolation and aids in achieving full pixel resolution in a final image.

Figure 11:
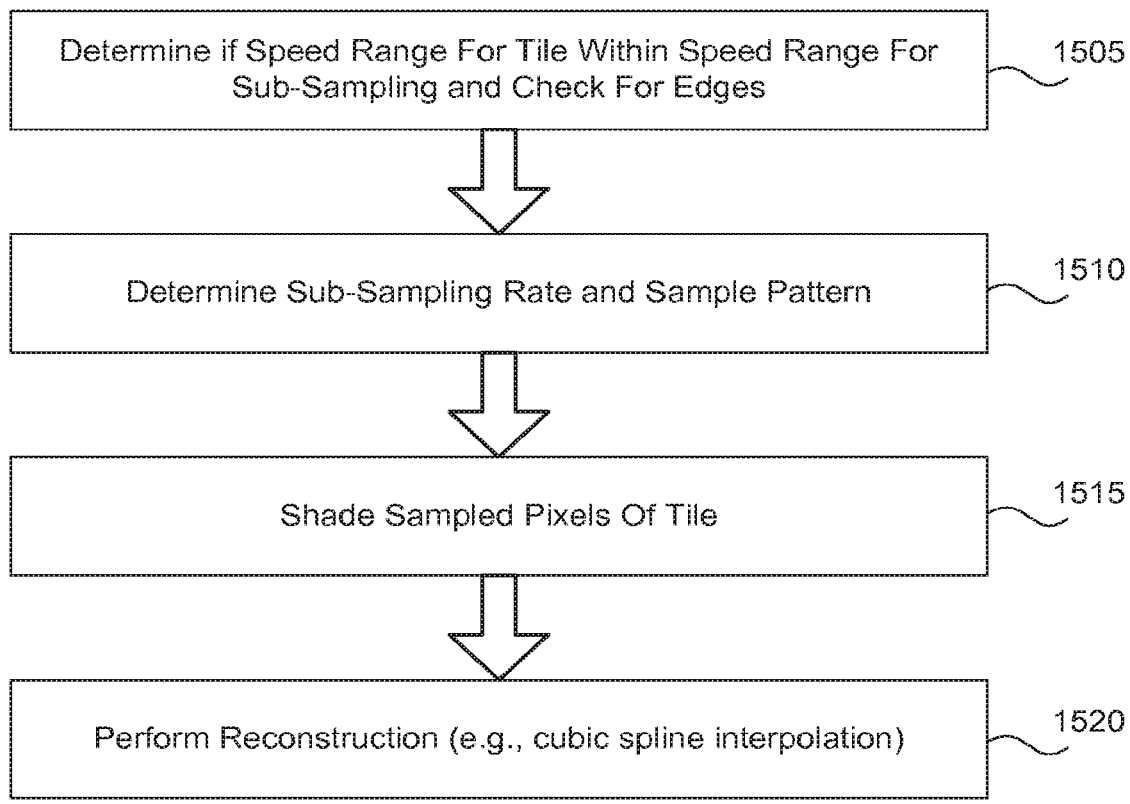
FIG. 11 illustrates a general method of adaptive desampling in accordance with an embodiment of the present invention.

FIG. 11 illustrates a general method of adaptive desampling and spline interpolation in accordance with an embodiment of the present invention. A determination is made 1505 if the speed range of the tile is within the speed range for sub-sampling and a check is made for the presence of edges. A determination 1510 is made of the sub-sampling rate and a sample pattern is chosen. The pixels of the tile are shaded 1515 based on the sampling pattern. Reconstruction is performed 1520 to interpolate missing pixel values, where spline interpolation may be performed.

Figure 12:
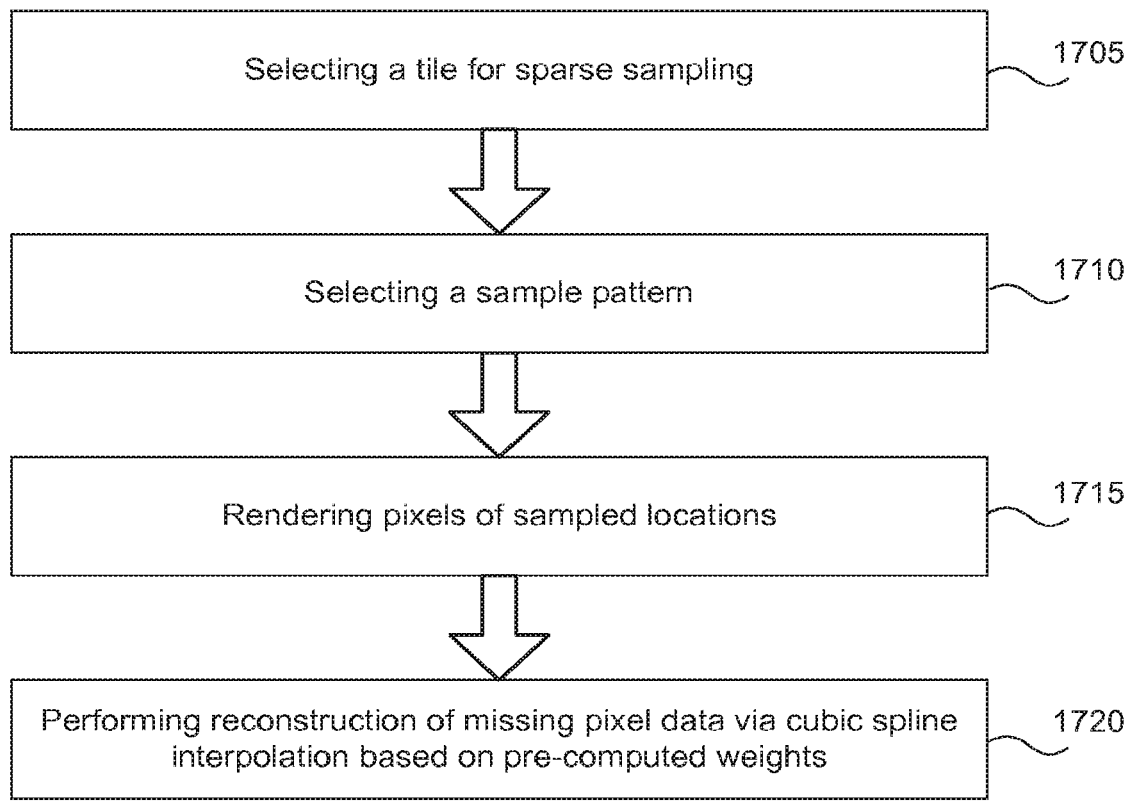
FIG. 12 illustrates a general method of performing cubic spline interpolation in a graphics system in accordance with an embodiment of the present invention.

FIG. 12 illustrates a method of performing cubic spline interpolation in accordance with an embodiment of the present invention. A tile is selected for sparse sampling 1105. A sample pattern is selected 1110. Pixels are rendered 1115 for the sampled locations. Reconstruction is performed of missing pixel data via cubic spline interpolation based on pre-computed weights 1120.

Figure 13:
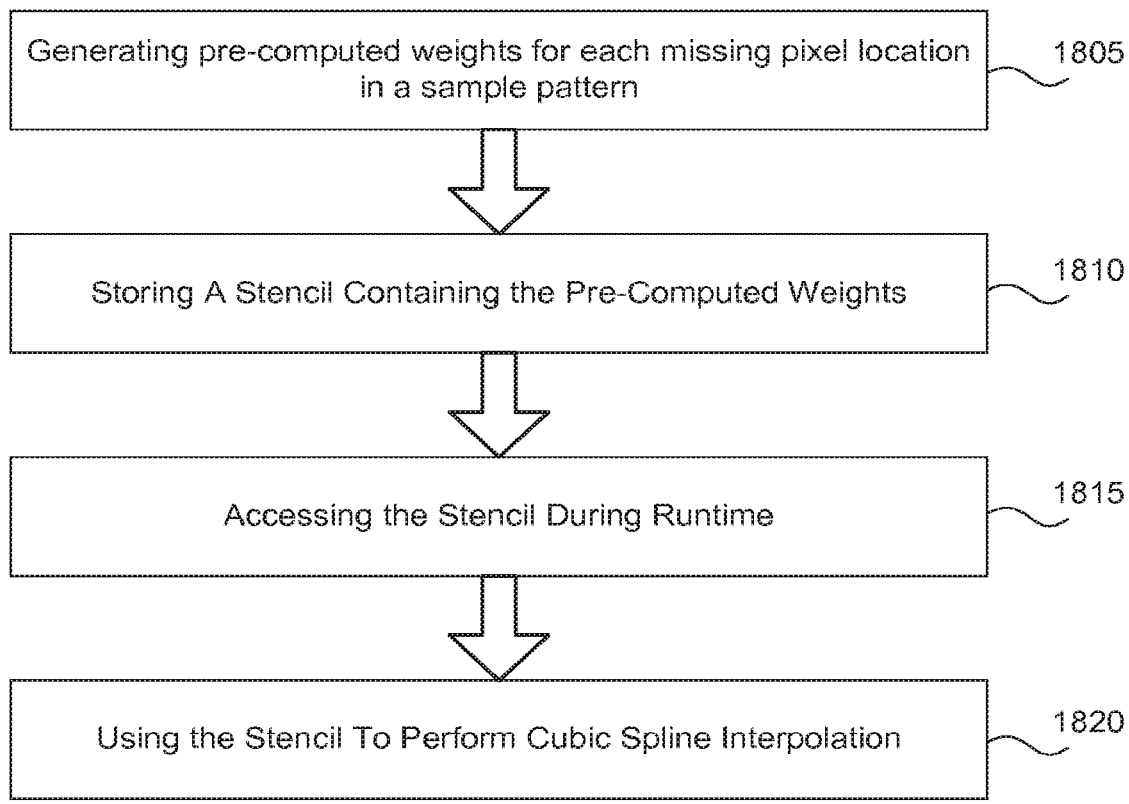
FIG. 13 illustrates a general method of performing cubic spline interpolation in a graphics system in accordance with an embodiment of the present invention.

FIG. 13 illustrates a method of utilizing stencils containing pre-computed weights in accordance with an embodiment of the present invention. Pre-computed weights are generated for each missing pixel location in a sample pattern 1805. A stencil containing the pre-computed weights is stored 1810. The stored stencil is accessed during runtime 1815. The accessed stencil is used to perform cubic spline interpolation 1820.

Example Comparison of Advection and Reconstruction

FIG. 14 illustrates an example of aspects of advection and reconstruction via cubic splines. The tile size is a 4×4 tile size. The pixel pattern in the previous frame is a checkerboard pattern. The rendered pixel values are denoted by an R. In the example on the left, advection is performed to reuse half of the pixel color data from the previous frame in a 4×4 tile. The velocity associated with the tile is very low and half of the pixels are advected by copying them from pixel values of the previous frame. Arrows are shown for four of the pixels to indicate reuse of pixel data from the same tile in the previous frame. In this case the color information is copied with no bleeding of color. In the example on the right there is a significant tile speed, corresponding to a half-pixel displacement per frame. In this example reconstruction is performed based on cubic spline interpolation. The velocity along x a 0.5 pixels leads to each rendered pixel having grey exactly halfway between black and white. The reconstructed pixels thus have the same value. That is, the color values are correct, and a full resolution render would also create the same values.

Automatic Tile-by-Tile Adaptive Rendering Example

Figure 15A:
FIGS. 15A and 15B illustrates an example in which different regions of a frame are adaptively rendered using different approaches based on a magnitude of per-pixel velocity.
Figure 15B:
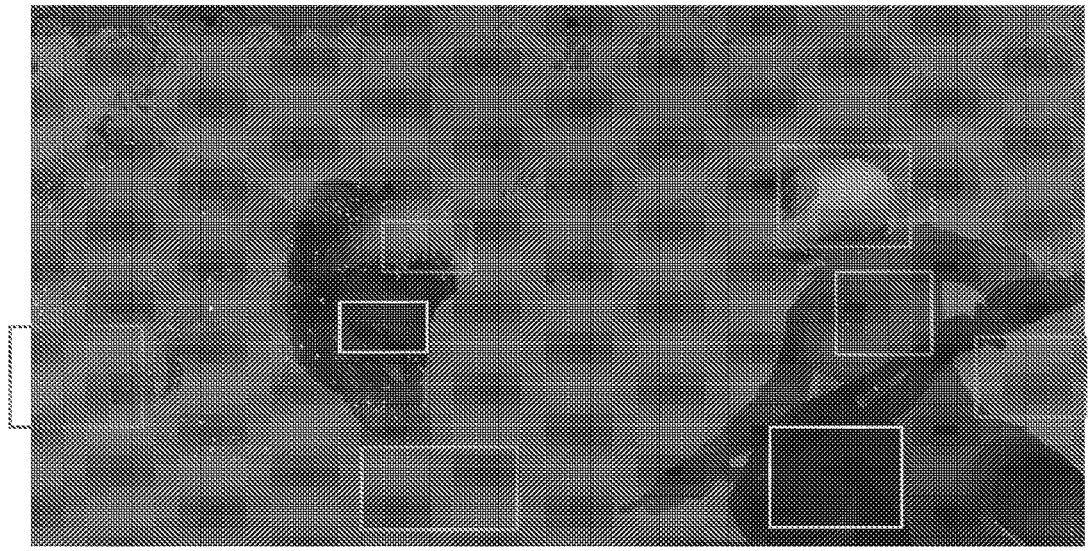

FIG. 15A illustrates an example of a frame in which the scene has regions in which the pixel velocity differs from other regions and some regions include color edges. As an example, the scene may include a rider on a motorcycle as well as stationary objects and quasi-stationary objects, such as plants moving slowly in the wind. Thus, there are regions that can be classified in different speed regimes. Consequently, as indicated by the boxes in FIG. 15B, different regions of the scene have different pixel velocities, with some of the regions providing different opportunities for adaptive rendering. As a result, in an individual frame the system automatically analyzes individual tiles and makes a determination on a tile-by-tile basis whether to desample and perform advection, desample and perform cubic spline interpolation, or utilize a normal default sampling scheme. Individual decisions may also be made on a tile basis whether or not to perform super-sampling. As the system automatically performs this optimization, no special inputs from an application developer are required, assuming relevant parameter values are defined separately.

Stereoscopic Rendering Example

Figure 16:
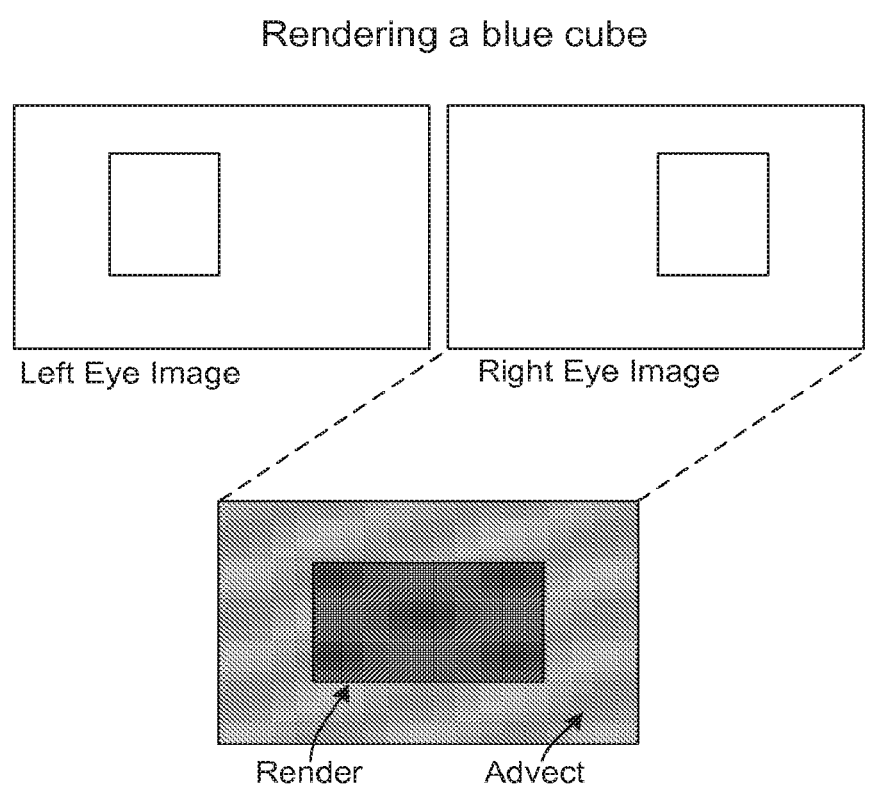
FIG. 16 illustrates an example of using advection for stereoscopic rendering in accordance with an embodiment of the present invention.

Embodiments of the present invention may be used to generate a single (non-stereoscopic) display. However, it may also be applied to stereoscopic rendering for virtual reality applications. Referring to FIG. 16, consider the case where separate images are generated for each eye, corresponding to a left eye image and a right eye image. Advection may be used to improve the efficiency of the stereoscopic rendering. In one embodiment a left image is generated. A translation motion, motion$_{trans}$, is defined as the translation to transform portions of the left-eye image to a right eye image. In one embodiment, the sample generator decision making is augmented to make a sampling decision for the right image to attempt to advect pixel values from the left image. In one embodiment, the sampling is Z-based and a test is performed whether a minimum Z of the left image and right image are greater than a threshold Z. If the min (Zleft, Zright)>Zthresh, pixels are advected from the left frame to the right using the motiontrans. Otherwise rendering is based on the motion based sampling rate. As illustrated in FIG. 11, this results in the right eye image being a combination of advected pixels from the left-eye image and rendered pixels.

Foveated Rendering Using Adaptive Rendering

Figure 17:
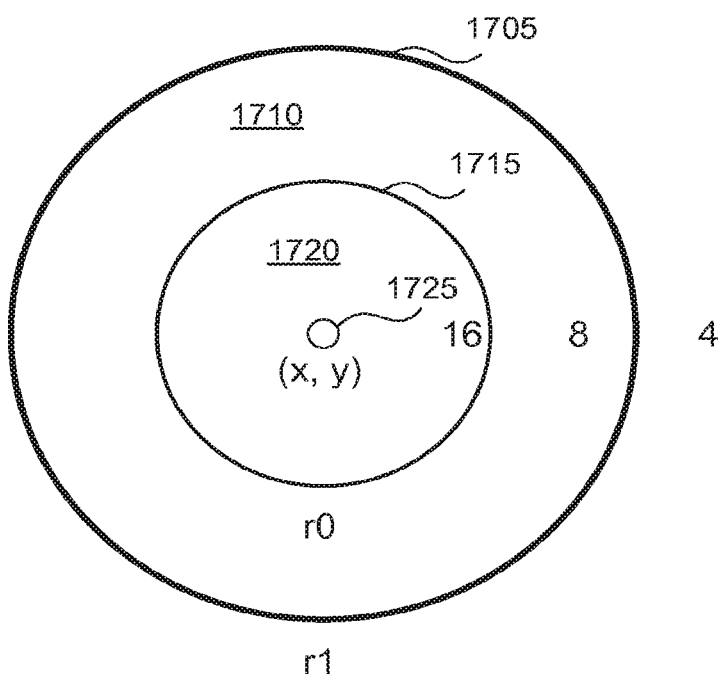
FIG. 17 illustrates adaptive rendering applied to foveated rendering in accordance with an embodiment of the present invention.

FIG. 17 illustrates an embodiment in which adaptive rendering is applied to foveated rendering. The structure of the human retina of the eye has a fovea portion that provides the highest visual acuity in a healthy human eye. The greatest visual acuity of a healthy human eye is within a small cone of angles and drops off with increasing angular distance. Foveated rendering renders higher detail near where the user is looking and lowers the detail further from the focus point. FIG. 17 illustrates a focal point (x,y) 1725. The sampling rate is decreased with increasing radial distance from the focal point (e.g., 1/(distance from the focal point). The decrease may be performed in a stepwise fashion at specific radial distance. For example, a specific number of samples may be rendered in a circular region 1720 up to a radial distance r0 1715. A lower number of samples are rendered in the annular region 1710 from r0 to r1 1705. An even lower number of samples are rendered in the region having a radial distance greater than r1. As an illustrative example, 16 samples may be rendered in the region between (x,y) and r0, 8 samples rendered in the region between r0 and r1, and 4 samples in the region beyond r1. More generally other radially varying sampling functions may be used.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing machines. In addition, those of ordinary skill in the art will recognize that devices, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Adaptive Rendering Using Intra-Frame and Inter-Frame Information Example

Pixel shading (PS) may be defined as computing the color of each pixel of an image in a display. For example, in computer graphics, a pixel shader (or a fragment shader) may be a computer program which may help in detecting the color, brightness, contrast, and/or other characteristics of a single pixel. In the example embodiments of the current disclosure, "pixel sampling" and "pixel shading" may imply the same operation and may be used interchangeably.

Figure 1:
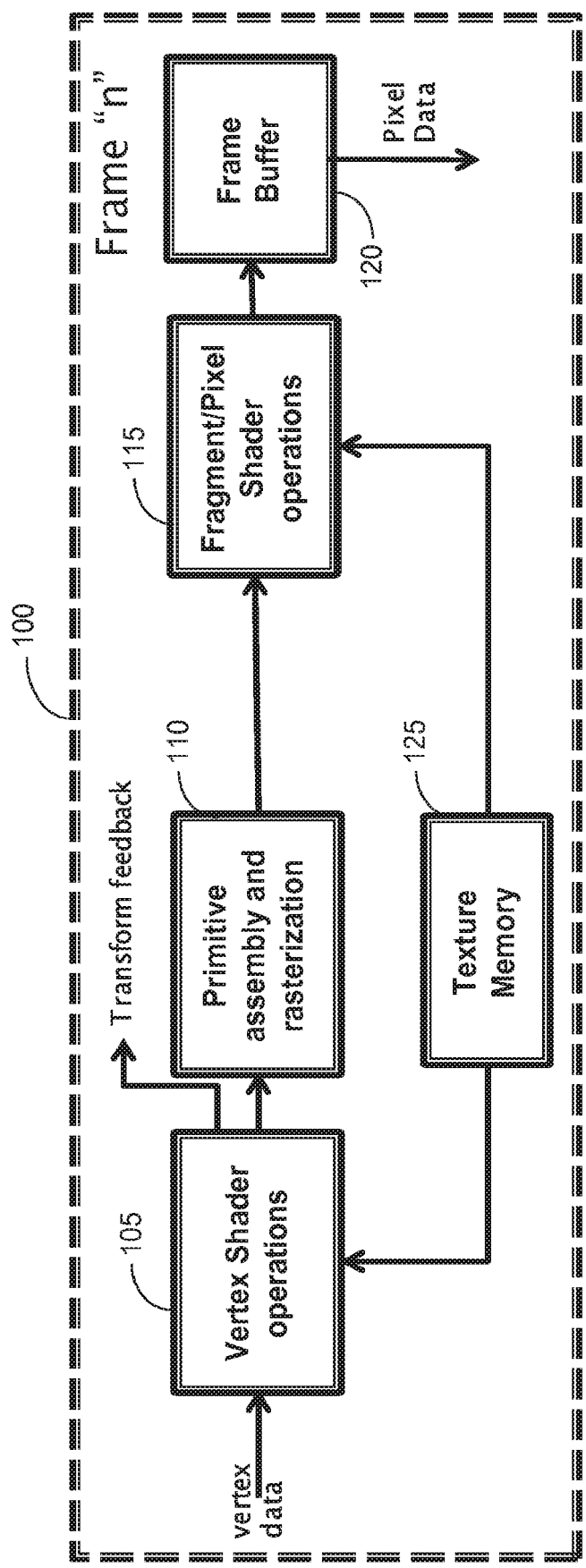
FIG. 1 illustrates a conventional graphics pipeline.

Graphics processing units (GPUs), which perform the pixel shading operations, are becoming increasingly limited by their energy consumption. As discussed with respect to FIG. 1, pixel shading may be an expensive operation with respect to energy consumed during the computation performed for the pixel shading operation. Limiting the cost of shading in real-time rendering applications may be challenging, and therefore, it may be desirable to reduce the number of pixel shading (PS) invocations during rendering. Some GPUs may have at least 1 PS invocation per pixel, which may be wasteful with respect to energy consumption and performance of the GPU. For example, for each pixel in a screen, pixel shaders may be invoked to calculate the color the pixel.

Shading rate may refer to the resolution at which the pixel shaders are invoked. In some cases, the shading rate may be different from the overall screen resolution. A higher shading rate may provide more visual fidelity, however, may increase the cost associated with the GPU (e.g., processing power, energy consumption, etc.). On the other hand, a lower shading rate may provide a lower visual fidelity at a lower GPU cost. During rendering, when a shading rate is set, that shading rate is applied to all the pixels in a frame. However, all the pixels in the frame may not require the same level of visual fidelity (e.g., the pixels which do not change significantly in a current fame compared to the previous frame).

However, some GPUs may have additions to allow applications to reduce shading rates (e.g., reducing the sampling or shading rate is also discussed with respect to FIG. 4). In some cases, the related art GPUs may allow the applications running on the GPU (e.g., the rendering applications) to provide a shading rate, or define methods by which the GPU (e.g., a software (SW) layer of the GPU) may compute the shading rate to be used for the pixel shading. For example, some related art methods may allow to selectively reduce the shading rate in areas of the frame where it would not affect the visual quality, and therefore extra performance gain may be achieved, which may in turn reduce the GPU cost. However, such related art methods that allow the application to provide a shading rate or define methods to compute the shading rate may not be automatic or transparent, and may require an application running on the GPU (e.g., a rendering application) to explicitly select them.

An ideal number of pixel shading invocations may be determined as Nyquist sampling of the image signal. For example, according to the Nyquist sampling of the image signal, the number of samples for accurate reconstruction of an image must be at least twice the largest frequency in the image signal.

Some embodiments of the present disclosure may provide the hardware and the software additions to a GPU which may be desired in order to approach Nyquist optimality in rendering. Some embodiments of the present disclosure may also provide methods for controlling the shading rate for an image, as well as heuristics and mechanisms to automatically control the shading rate to minimize shading cost while maintaining the final image quality.

Some embodiments of the present disclosure may utilize sets of heuristics, which may be executed in software (SW) and/or hardware (HW) that may use backwards and/or forwards error analysis within a frame to determine desired shading rate for various shading computations. For example, a backwards error analysis approach may be used to determine scenarios where all samples need not be shaded, for example, where the reduction in shading requirement stems from, for example, Depth-of-Field (DoF), motion blur, camera blur, or other similar quality reducing stages in the rendering pipeline. For example, Depth-of-Field (DoF) may reduce the image quality and therefore may need fewer shaded samples to achieve a similar quality. In such a case, a combination of driver-compiler interaction may be used to reduce the shading rate.

For example, as also discussed with respect to FIG. 7A, in one embodiment, back and forth error correction and compensation (BFECC) may utilize the position determined from Semi-Lagrangian advection and may add the velocity at that coordinate to obtain a new position in the current frame. If there is no error, this coordinate should be the same as the original position (x, y). Otherwise, by subtracting half of this error from $(x-v_x, y-v_y)$ the second-order, accurate estimate of the position may be obtained, which may be accurate to half a pixel, assuming that the velocity is accurate (e.g., pixel accurate).

For example, some embodiments of the present disclosure may utilize a set of heuristics for reusing (or reprojecting) some or all of the pixel (or rendered) data, from any image in a current or preceding frame (e.g., similar embodiments are discussed with respect to FIG. 2, FIG. 4, FIG. 7A, FIG. 7B, and FIG. 14). For example, some embodiments of the present disclosure may detect, within a frame, that an image to be rendered utilizes one or more viewports which are significantly (or sufficiently) similar to one or more viewports in another image, or may detect, within an image, that one or more viewports are similar to each other, or may establish that beyond a certain distance from the camera, the rendered results will be sufficiently identical from such similar viewports (e.g., similar embodiments are discussed with respect to FIGS. 16-17). Further, some embodiments of the present disclosure may reuse (or reproject) some or all of pixel (or rendered) data, from any image in a current or preceding frame based on the determination of the similarity of the viewports.

Some embodiments of the present disclosure may combine the backwards and/or forwards error analysis within a frame to determine a desired shading rate for various shading computations and reuse some of the pixel data, from any image in a current or preceding frame to collectively reduce number of shading samples by hardware and software analysis utilizing hardware for API features. For example, some embodiments of the present disclosure may track objects across frames using application assistance along with driver resource tracking to reuse intermediate rendered results from one or more previous frames to assist the rendering of the current frame. Moreover, some embodiments of the present disclosure may detect, across frames, that certain regions within certain images are contributing to the final displayed image (e.g., including that image as well), do not change over frames, and may be reused (or reprojected) from the older rendered copies.

The fine-grained shading rate control has been discussed with respect to the example embodiments of, for example, FIGS. 3, 4, and 5, of the current disclosure. The example embodiment of FIG. 18 exercises the concept and functionality of the example methods of selecting a reduced sampling rate discussed earlier (e.g., with respect to FIGS. 3, 4, 5, 11, and 17, for example, selecting reduced sampling rate based on velocity and edge detection, and in some cases (e.g., FIG. 17) increasing radial distance from the focal point) with additional heuristics to reduce the rendering costs even further. The example embodiment of FIG. 18 (e.g., the example method of generating the shading rate image) may also be codified in API extensions, which may be attached to any image to control the number of pixels shaded for any, for example, 4×4 block of pixels rendered.

Figure 18:
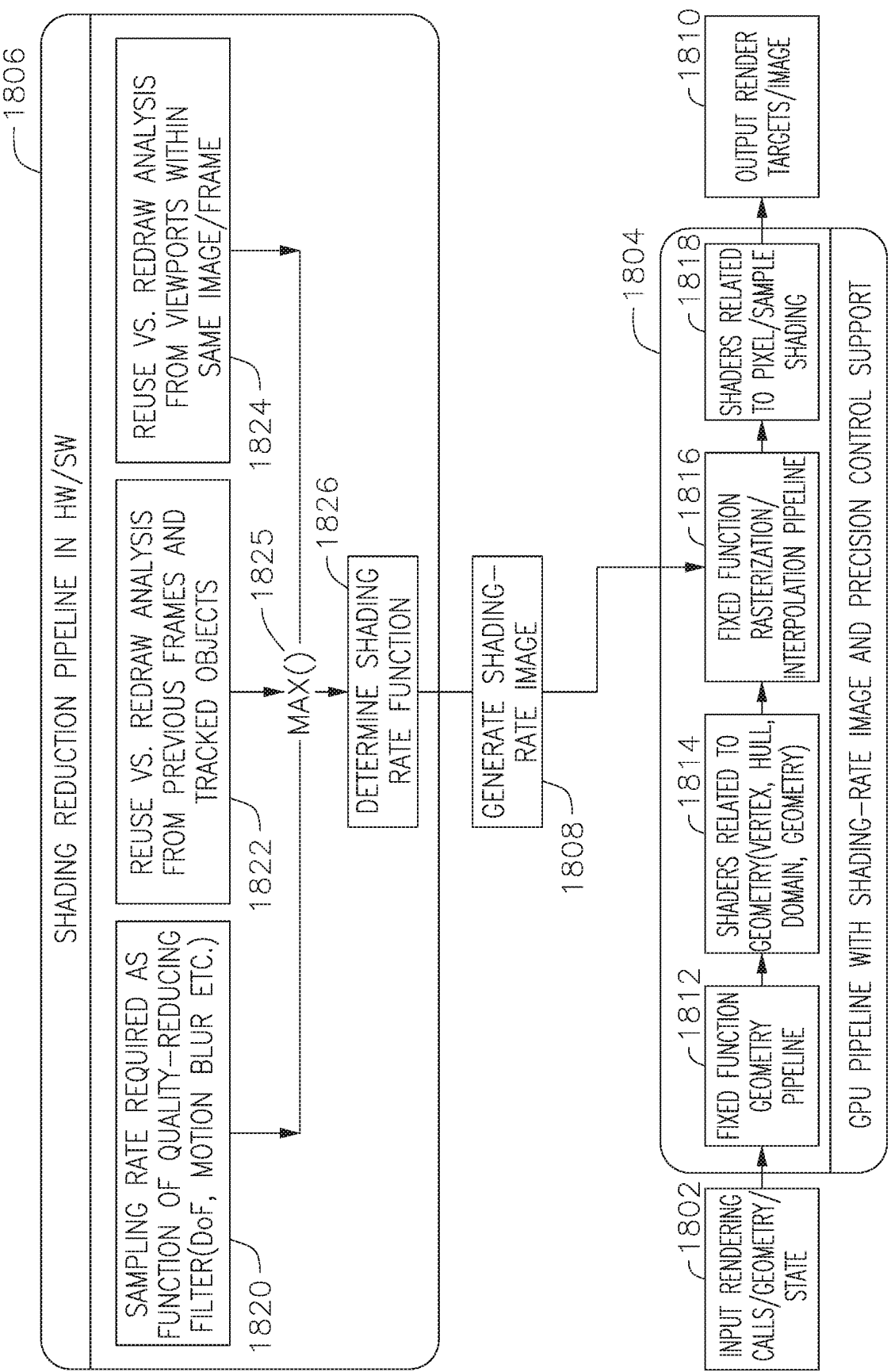
FIG. 18 illustrates an example GPU pipeline.

FIG. 18 illustrates an augmented GPU pipeline that utilizes example sets of heuristics to reduce rendering work performed in both shading and fixed function stages of the GPU pipeline by reducing the shading rate. In the example embodiment of FIG. 18, the detection and the computation of the shading rate image may be performed by any combination of hardware and/or software components of the GPU.

The GPU pipeline 1800 of FIG. 18 includes an input stage 1802, a GPU pipeline with shading-rate image and precision control support stage 1804, a shading reduction pipeline stage 1806, a shading rate image stage 1808, and an output stage 1810.

The input stage 1802 may provide the input rendering calls or the input image geometry (e.g., 3-dimensional coordinates, color, texture, etc. of the input image) to the GPU pipeline stage 1804. The GPU pipeline stage 1804 may be similar in function to the graphics pipeline 200 of FIG. 2. The GPU pipeline stage 1804 may include a fixed function geometry pipeline stage 1812, the shaders related to the geometry stage 1814, a fixed function rasterization or interpolation pipeline stage 1816, and the shaders related to the pixel or sample shading stage 1818.

The input image geometry from the input stage 1802 may be received at the fixed function geometry pipeline stage 1812 of the GPU pipeline stage 1804. The output from the fixed function geometry pipeline stage 1812 may serve as an input to the shaders (e.g., vertex, hull, domain, geometry, etc.) related to the geometry stage 1814. The stage 1814 (e.g., vertex shader (e.g., vertex shader 105 of FIG. 2)) may process the vertices from the received input, perform per-vertex operations such as transformations, skinning, morphing, and per-vertex lighting. The stage 1814 may also convert the low-detail subdivision surfaces into higher-detail primitives on the GPU, and may perform tessellation tiles (or breaks up) to convert high-order surfaces into suitable structures for rendering, etc. The output from the stage 1814 may serve as an input to the fixed function rasterization or interpolation pipeline stage 1816.

The rasterization stage 1816 may convert the vector information (e.g., composed of shapes or primitives) received from shaders related to the geometry stage 1814 into a raster image (e.g., composed of pixels) for the purpose of displaying a real-time 3D graphics. The rasterization stage 1816 may be the same as the rasterization stage 110 of FIG. 2. The output from the rasterization stage 1816 may serve as an input to the shaders related to pixel or sample shading stage 1818. The stage 1818 (e.g., a pixel-shader) may be the same as the fragment or pixel shader operations stage 115 of FIG. 2 and may enable shading techniques (e.g., rich shading techniques) such as per-pixel lighting and post-processing. In some embodiments, a pixel shader is a program that combines constant variables, texture data, interpolated per-vertex values, and other data to produce per-pixel outputs. The rasterizer stage (e.g., 1816) invokes a pixel shader once for each pixel covered by a primitive.

The output from the stage 1818 may serve as an input to the output stage 1810. The output stage 1810 may generate the final rendered pixel color using a combination of pipeline stages (e.g., 1812, 1814, 1816), the pixel data generated by the pixel shaders (e.g., 1818), the contents of the render targets, and the contents of the depth or stencil buffers. The output stage 1810 may be the final step for determining which pixels are visible (e.g., with depth-stencil testing) and blending the final pixel colors.

In some embodiments, the rasterization stage 1816 produces its output (e.g., a raster image) based on the vector information received from the geometry shader stage 1814 as well as the shading rate image generated from the shading rate image stage 1808. The shading rate image stage 1808 may generate the shading rate image based on the output from the shading reduction pipeline stage 1806. In some embodiments, the shading reduction pipeline 1806 may be a set of software or hardware that generates a shading rate image automatically without the knowledge of the application to feed an extension to any GPU that supports the API.

The shading reduction pipeline stage 1806 includes a sampling rate stage (or heuristic) 1820 (e.g., the sampling rate required as a function of quality reducing filter (depth-of-field (DoF), motion blur, etc.)), a reuse vs. redraw analysis from previous frames stage (or heuristic) 1822, a reuse vs. redraw analysis from other viewports stage (or heuristic) 1824, and a shading rate functional determination stage 1826.

The sampling rate stage 1820 relies upon the detection of quality reduction filters, for example, DoF, motion blur, smoothing filters, or the like, which have the feature of averaging over multiple samples (or taps) from input textures rendered on the GPU. Once such a pattern is detected, the pattern may be utilized to make a decision on the shading rate desirable (or necessary) to achieve acceptable (or sufficient) quality, as discussed with respect to FIG. 20 in later sections of the current disclosure.

In some embodiments, shading rate reduction may also be achieved by analyzing cross-frame changes in the underlying assets in a rendered image (e.g., changes in underlying assets, (e.g., camera and viewport) between an input image frame and an output image frame).

In one embodiment, the GPU may check for changes in underlying assets, for example, camera and viewport (for example, anything that changes how the scene is viewed by the viewer), and use reprojection to reuse data from the prior image. If any other assets including geometry, shaders, states, or transformation change, then it would not be possible to reuse or reproject the prior image data into the current image.

For example, in one embodiment, in stage 1822, if in a region of the rendered image, the underlying assets do not change (or the change is below a threshold value), or the change can be expressed as a linear transform (e.g., an affine transform), then the image data from the previous frame(s) may be reused instead of being rendered (or redraw) again. In such regions of the rendered image, the shading rate may be reduced to zero, and the pixel data may be copied from the previous frame(s) with minor transforms (or transformations) if needed (e.g., reusing a fraction of pixels from the previous frame is also discussed with respect to FIGS. 2, 4, 7A, and 14). In some embodiments, re-projection may be used instead of the reuse of the pixel data.

In some embodiments, reprojection may be an example (e.g., a specialization or a use case) of reuse. In some embodiments, reuse may imply that the data is copied from a prior image into the current image. Reprojection may include other example use cases, for example, if the camera moves, then the pixels may get warped, and therefore, in order to reuse the pixel data from a prior image, the pixel data from a prior image may be reprojected into the current image.

In some embodiments, the reuse of pixel data from the previous frame may require that the graphics state does not change from the previous frame to the current frame, where the graphics state includes the shaders used, the constants provided to the shaders, and the geometry provided to the frames.

In some embodiments, shading rate reduction may be achieved by detecting multiple similar viewports within a same image or a same frame (e.g., the change between the first viewport of the current image frame and the second viewport of the current image frame is below a threshold). For example, in stage 1824, GPU may detect, within a frame, that an image to be rendered utilizes one or more viewports which are significantly (or sufficiently) similar to one or more viewports in another image, or may detect, within an image, that one or more viewports are similar to each other, or may establish that beyond a certain distance from the camera, the rendered results will be sufficiently similar or identical from such similar viewports (e.g., similar embodiment is described with respect to FIG. 16 of the current disclosure). Some embodiments of the present disclosure may reuse (or reproject) some or all of pixel data, from any image in a current or preceding frame, based on determining the similarity of the viewports.

Figure 19A:
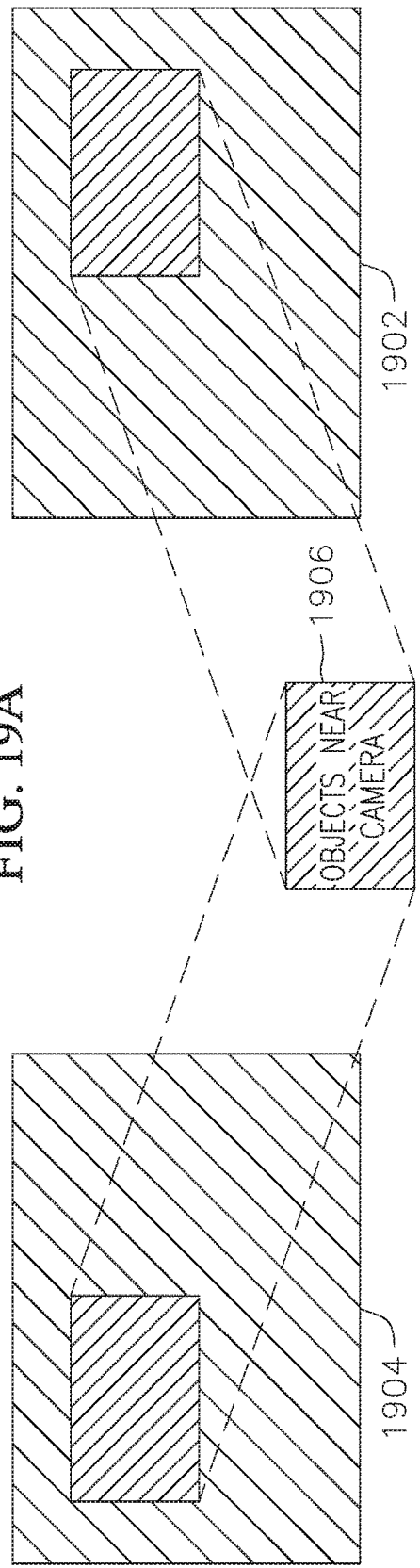
FIGS. 19A and 19B illustrate an example of reusing (or reprojecting) data from another viewport.
Figure 19B:
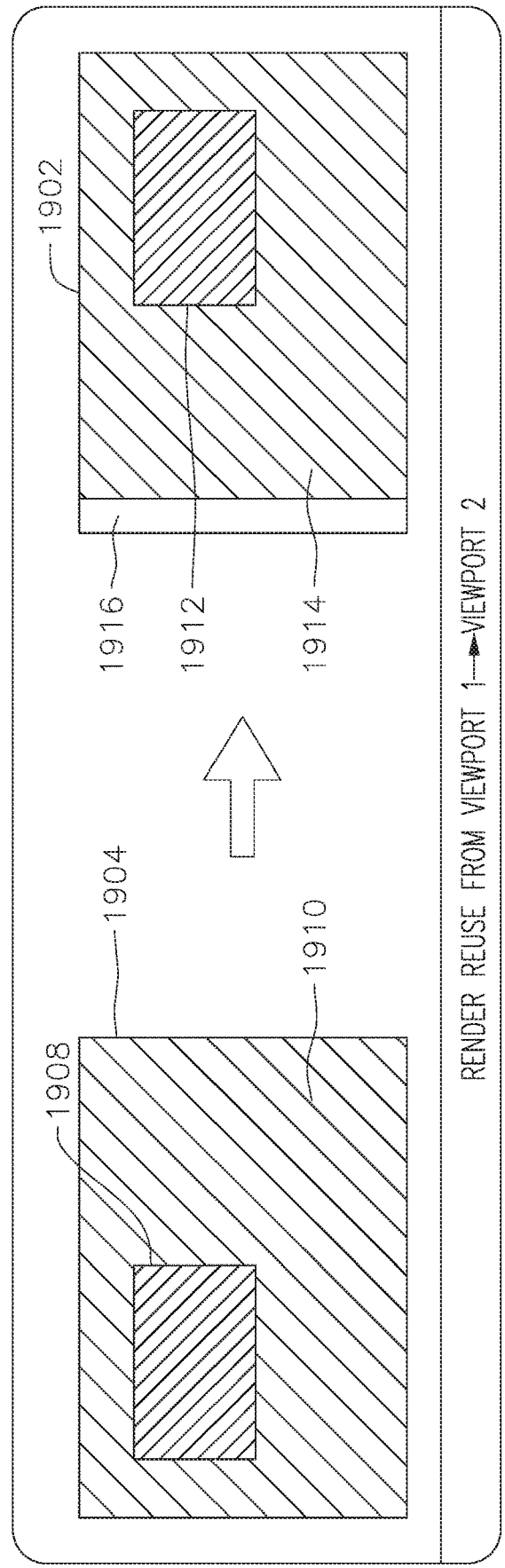

For example, FIGS. 19A and 19B illustrate an example of reusing (or reprojecting) data from another viewport in stereo rendering cases, as well as reusing (or reprojecting) pixel data across cameras. In the example embodiment of FIGS. 19A-19B, a transform matrix may be defined to map any pixel (x, y) in viewport 2 1902 to another pixel coordinate (x', y') in viewport 1 1904. Thus, if (x', y') are within bounds, and have the same occlusion characteristics, then that data (e.g., pixel data) may be copied from viewport 1 1904 to viewport 2 1902. In some embodiments, occlusion characteristics may imply that the data copied across viewports come from the same object, or same class of objects, where the class may be defined by the depth range of said objects. In some embodiments, if (x', y') is out-of-bounds in viewport 1 1904, then there is no reference data to copy, and thus pixel (x, y) will be rendered in viewport 2 1902. In some embodiments, the reuse vs. redraw analysis from other viewports stage (or heuristic) 1824 may identify and separately handle objects close to the camera 1906 because the lighting may vary significantly (or relatively largely) across viewports.

For objects or a background far from the camera, the difference in viewports may be considered small enough so as to not cause a relatively large or significant difference in lighting, thus allowing the reuse (or reprojection) of the pixel data. In the example embodiment of the present disclosure, the shading rate of the regions with nearby objects (or foreground) may be the maximum required, while that for regions with far objects (or background) may be the minimum supported, with the remaining un-rendered pixels/samples being filled by copying (or reusing or reprojecting) data across viewports.

For example, in FIG. 19B, in viewport 1 1904, the foreground 1908 and the background 1910 both have been rendered fully. However, in viewport 2 1902, only the foreground region 1912 and the region 1916 have been rendered. The foreground region 1912 in viewport 2 1902 have been rendered because the difference in the foregrounds (1908 and 1912) of the viewports (1904 and 1902) may be considered significant (or sufficiently high). The region 1916 of the viewport 2 1902 has been rendered because that region was never sampled in viewport 1 1904. The rendered data from the background 1908 of the viewport 1 1904 have been reused (in some cases reprojected) in the background 1914 of the viewport 2 1902, because the backgrounds 1910 and 1914 of viewport 1 1904 and viewport 2 1902 are far from the camera, and therefore, the difference in the backgrounds (1910 and 1914) of the viewports (1904 and 1902) may be considered small enough to not cause a relatively large or significant difference in lighting. In FIGS. 19A-19B, the viewport 1 1904 and the viewport 2 1902 may correspond to a left eye image and a right eye image (e.g., as discussed with respect to FIG. 16).

Returning back to FIG. 18, each of the heuristics 1820, 1822, and 1824 may determine a suggested shading rate based on their respective analysis. For example, the heuristic 1820 may suggest or determine a first shading rate for the input image, the heuristic 1822 may suggest or determine a second shading rate for the input image, and the heuristic 1824 may suggest or determine a third shading rate for the input image based on their respective analysis.

In some embodiments, the GPU may apply as many of these heuristics (e.g., 1820, 1822, and 1824) in the shading reduction pipeline stage 1806, as necessary or desired, because each of the heuristics (e.g., 1820, 1822, and 1824) may analyze a particular region of the rendered image and may provide shading rate accordingly. For example, in one embodiment, the heuristic 1820 may analyze a first region of the rendered image or the output image and may provide the first shading rate for the input image with respect to the first region. Similarly, in some embodiments, the heuristic 1822 may analyze a second region of the rendered image or the output image and may provide the second shading rate for the input image with respect to the second region, and the heuristic 1824 may analyze a third region of the rendered image or the output image and may provide the third shading rate for the input image with respect to the third region.

In some embodiments, the first region of the rendered image or the output image is a rendered subset (e.g., a first subset) of pixels in the rendered image or the output image, the second region of the rendered image or the output image is another rendered subset (e.g., a second subset) of pixels in the rendered image or the output image, and the third region of the rendered image or the output image is yet another rendered subset (e.g., a third subset) of pixels in the rendered image or the output image.

Once the shading rates according to the heuristics (e.g., 1820, 1822, and 1824) are determined, at 1825, the GPU may use a resolution resolving filter, for example, a max filter which would result in the maximal shading rate across all heuristics (e.g., 1820, 1822, and 1824), to determine the shading rate image (e.g., at 1808). For example, the GPU may use the max filter to select the maximal shading rate from among the first shading rate, the second shading rate, and the third shading rate for the input image.

In some embodiments, based on the shading rates according to the heuristics (e.g., 1820, 1822, and 1824), the GPU may determine the shading rate functional at stage 1826 to compute or generate the shading rate image at stage 1808. In some embodiments, the maximum (or minimum) shading rate from the shading rates suggested by each of the heuristics (e.g., 1820, 1822, and 1824) may be selected to generate shading rate image at stage 1808, which may be inputted to stage 1816 to generate output rendered image at stage 1810.

In some embodiments, two or more shading rates from the shading rates suggested by the each of the heuristics (e.g., 1820, 1822, and 1824) may be selected to render different portions of the image. However, the decision of selecting the maximum or the minimum shading rate may be fine-grained and context dependent. For example, if the quality reduction in the rendered image is caused by DoF or motion blur, minimum shading rate from the shading rates suggested by each of the heuristics (e.g., 1820, 1822, and 1824) may be selected to generate shading rate image at stage 1808. The method of determining the shading rate functional is discussed with respect to FIG. 20.

FIG. 20 is an example flowchart illustrating a shader analysis method to detect quality reduction in a rendered image and compute shading rate image (e.g., compute the shading rate for the input image). The shader analysis method 2000 may be performed at the GPU at the shading reduction pipeline 1806 at stage 1820.

As discussed previously with respect to FIG. 18, that the sampling rate stage 1820 relies upon the detection of quality reduction filters, for example, DoF, motion blur, smoothing filters, or the like, which have the feature of averaging over multiple samples (or taps) from input textures rendered on the GPU. Once such a pattern is detected, the pattern may be utilized to make a decision on the shading rate (e.g., shading rate for the input image) desirable (or necessary) to achieve acceptable (or sufficient) quality (e.g., quality of the output image), as discussed in the section below with respect to FIG. 20.

For example, FIG. 20 provides a detailed explanation of how the heuristics 1820 works. For example, in the example embodiment of FIG. 20, a processor or the GPU may determine that the rendering involves averaging input taps from an image or texture. Based on such a determination, the processor or the GPU may determine that more the number of taps, fewer the pixels the processor or the GPU need to render in the input image (e.g., the "inputcolor" as discussed with respect to 2006 of FIG. 20.)

For example, at 2002, a processor or the GPU may analyze the shading operations when rendering an output image (e.g., outputcolor). In one embodiment, at 2002, the pixel or fragment shaders may be analyzed to determine an existence of quality reduction in the output image (e.g., outputcolor).

If at 2002, no reduction in the quality of the output image is determined, at 2004, the GPU makes no modification to a current shading rate image (e.g., shading rate for the input image). However, if at 2002, a reduction in the quality of the output image is determined, at 2006, the GPU may determine if the shading operation of an output image (e.g., outputcolor) corresponds to a weighted sum of pixel data from one or more input images (e.g., outputcolor (x,y)=sum_i (weight_i (x_i, y_i)*inputcolor_i (x_i, y_i))). For example, in one embodiment, at 2006, the GPU may determine if an output color of the output image corresponds to a weighted sum of the pixel data from the one or more input images.

For example, in one embodiment, at 2006, the GPU may determine a functional for the final or output image (e.g., outputcolor), where a formula expressing the weighted sum of the pixel data to determine the final or output image (e.g., outputcolor) or a pixel color value of the final or output image (e.g., outputcolor) is as follows:

$$\text{outputcolor}(x,y) = \text{sum}\_i(\text{weight}\_i(x\_i, y\_i) * \text{inputcolor}\_i(x\_i, y\_i)),$$

where, i is in [0, . . . (N−1)], N is the number of input values (e.g., number of input pixels), and (x, y) is the pixel coordinate in the final or output image. In some embodiments of the present disclosure, N may be equal to four. In one embodiment, from the functional of the final or output image, it may be concluded that the "outputcolor" at a certain pixel is the weighted sum of different pixels coordinates.

In the example embodiments of the present disclosure, a functional may be defined as a function which receives another function as an input. For example, in case of a depth-of-field filter, different applications may program or define their depth-of-field filters in different ways. A functional may receive the application that defines the blur function as an input and then compute the shading rate (e.g., shading rate for the input image) as an output. In particular, the functional is the logic that determines the shading rate (e.g., shading rate for the input image) based on the particular filter (e.g., depth-of-field (DoF), motion blur, etc.), irrespective of how such filter is programmed or defined by the application.

At 2006, if the processor or the GPU determines that the shading operation of an output image (e.g., outputcolor) corresponds to a weighted sum of data from one or more input images (e.g., outputcolor (x,y)=sum_i (weight_i (x_i, y_i)*inputcolor_i (x_i, y_i))), at 2008, the processor or the GPU may reduce shading (e.g., shading rate, e.g., shading rate for the input image) (or generate a new shading rate image) of the input image (e.g., inputcolor), because shading a specific subset of samples in the input image (e.g., inputcolor) may be sufficient to get an accurate reproduction of the output image (e.g., outputcolor).

In one embodiment, at 2008, the processor or the GPU may generate a shading rate image (e.g., shading rate for the input image) for the input image or images (e.g., inputcolor). For example, at 2008, the GPU generates the shading rate image for the input image or images (e.g., inputcolor), where the number of shaded samples is inversely proportional to the number of input values "N" in the functional. However, the proportional relationship (or the exact proportionality) between the number of shaded samples and the number of input values "N" in the functional may be adjusted based on the workload of the GPU and the quality reduction determined at 2002. For example, in some embodiments, the weighted sum includes the weighted sum of the pixel data of the input images, over N input image frames of which the input image (e.g., inputcolor) is a specific instance.

At 2010, the GPU implements the combination of the shading rate image (e.g., from 2008, e.g., shading rate for the input image) with any others (e.g., 1822, 1824) that may exist using stages 1826 or 1808.

In one embodiment, the output from the method of FIG. 20 may serve as an input to the max( ) function at 1825 in 1806.

In one embodiment, the reduction in shading (e.g., shading rate for the input image) may not be for the same image. In some embodiments, using the information from one image (e.g., output image), the shading rate in a prior image (e.g., input image) may be reduced (the "prior image" here is not an image in terms of time, but in terms of dependency from the current image).

Figure 21:
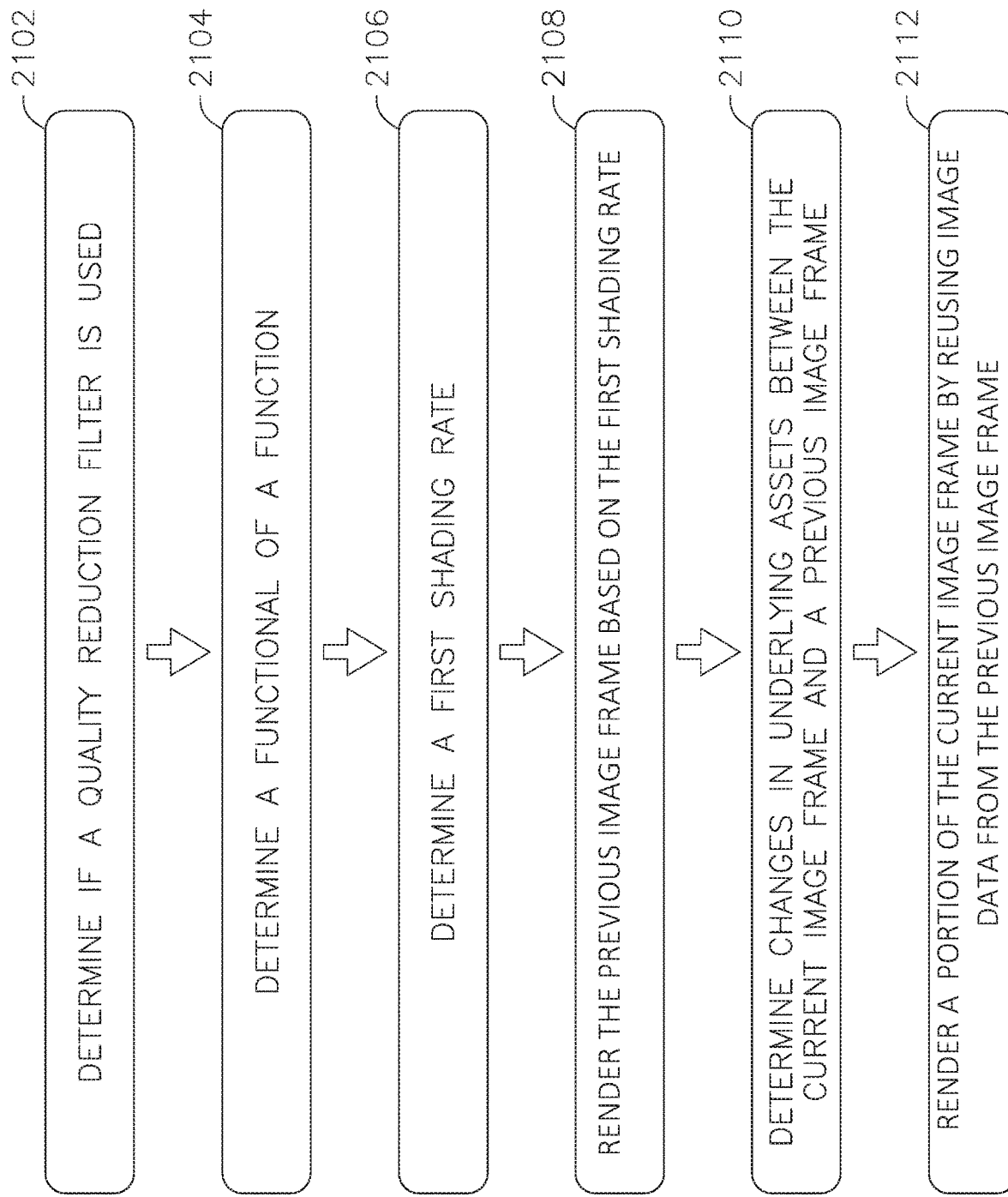
FIG. 21 illustrates an example method of performing adaptive shading of image frames by a graphics processing unit (GPU).

FIG. 21 illustrates an example method of performing an adaptive shading of image frames by a GPU, as discussed with respect to FIG. 18.

At 2102, the GPU determines if a quality reduction filter is used by applying one or more heuristics to a pixel shader in the GPU (e.g., as discussed with respect to FIG. 18).

At 2104, the GPU determines a functional of a function in the pixel shader based on determining that the quality reduction filter is used in the GPU (as discussed with respect to FIG. 20).

At 2106, the GPU determines a first shading rate for a previous image frame (e.g., the input image frame) (or at least a portion of the previous image frame) based on the functional (as discussed with respect to FIG. 20). In some embodiments, a portion of the previous image frame (e.g., the input image frame) is a rendered subset (e.g., a first subset) of pixels in the previous image frame.

At 2108, the GPU renders the previous image frame (e.g., a portion of the previous image frame) based on the first shading rate (as discussed with respect to FIGS. 18 and 20).

In some embodiments, at 2110, the GPU check for changes in the underlying assets, for example, camera and viewport (for example, anything that changes how the scene is viewed by the viewer), and use reprojection to reuse data from the prior image or previous image frame. If any other assets including geometry, shaders, states, or transformation change, then it may not be possible to reuse or reproject the prior image into the current image. In one embodiment, at 2110, GPU determines changes in underlying assets between the current image frame and a previous image frame (as discussed with respect to 1822 of FIG. 18, e.g., changes in underlying assets, (e.g., camera and viewport) between an input image frame and an output image frame).

In some embodiments, at 2112, the GPU renders the current image frame (or a portion of the current image frame) by reusing or reprojecting image data from the previous image frame or based on the second shading rate based on determining that changes in underlying assets between the current image frame and the previous image frame is below a first threshold (as discussed with respect to FIGS. 18, 19, and 20). In some embodiments, a portion of the current image frame is a rendered subset of pixels in the current image frame.

Example Embodiment for Depth-of-Field Based Quality Reduction

In some example embodiments, a depth-of-field experiment may be an example of the embodiment of FIG. 20, where a specific function and functional may be used, and it may be determined that the use of shading rate reduction may not lead to noticeable loss in quality (e.g., as measured by the industry standard metric peak signal to noise ratio (PSNR)).

In one embodiment, the shader may use the per-pixel depth and compare the per-pixel depth to a focal length (e.g., distance at which a camera is focused to, e.g., human visual system approximates a lens with a focal length of 50-55 mm). The difference between the per-pixel depth and the focal length may decide how blurry of a result may be copied from the input image using a level of detail (LOD). If the per-pixel depth is close to the focal length, then the chosen LOD may be close to 0 (e.g., most detailed). However, if the per-pixel depth is far away from the focal length, then higher LOD levels may be chosen.

Higher LOD levels may be an average of lower LOD levels (e.g., Level 1 is an M×N averaged version of a 2M×2N Level 0). Thus, a processor or the GPU may create a function in which the outputcolor (x, y) is a weighted sum of a number of pixels of the inputcolor Level 0 up to a certain distance from (x, y) where the weight decreases radially based on the distance from (x, y).

Therefore, in one embodiment, if the per-pixel depth of (x, y) is far from the focal length, then the processor or the GPU may reduce the shading rate of the inputcolor image Level 0 since the error in shading may be averaged out across many pixels. The inputcolor Level 0 image may be the most expensive image to render in that specific workload, and therefore, the savings may be relatively high or significant compared to the related art methods. Therefore, the shading may be reduced (and the amount of work needed for the shading may be reduced as well) using this logic, while keeping the quality (as measured by the PSNR) within an acceptable level (e.g., below the visible levels).

In the example embodiments of the present disclosure, PSNR may be the log of mean-square error (i.e., compute a per-pixel difference in the color values from (1) full-resolution render, and (2) rendering using the above-mentioned example approach. Then sum the square of this per-pixel difference, and compute log (sqrt(sum)) to determine PSNR). It may be desirable to have PSNR as high as possible.

In one embodiment, if PSNR is greater than or equal to 40, then it may be visually indistinguishable from the full resolution render for most people, and for greater than or equal to 50 or 60, it may be visually indistinguishable for all people. With a PSNR of greater than or equal to 40, saving of almost 25% of the shading work in the input image (e.g., inputcolor Level 0 image) may be achieved.

As discussed with respect to FIG. 2, adaptive desampling (AD) may a lossy quad culling technique by which information about the spatial profile of a final image detail is back-propagated to earlier stages of the graphics pipeline to identify regions where rendering fewer quads and interpolating between them may cause minimal visual artifacts. In some cases, by exploiting parameter settings of level of detail (LOD) features (e.g., in texture samplers), areas that need greater rendering detail than others may be identified and used by the AD to reduce render work.

In some cases, AD may be used to save rendering work, for example, in an area of an image, where rendering may not be necessary. For example, areas of a render target (e.g., image) that do not require fine scale details may often be rendered at a lower resolution without suffering noticeable visual artifacts. In some cases, AD may sparsely render a full resolution image, and reconstruct the pixels in-between. In order to accomplish such results, AD may employ a rendering scheme whereby quads (e.g., the 2×2 block of pixels that is the basic unit of work in rendering) are re-mapped within a 4×4 block (e.g., a MultiQuad) to a non-contiguous set of 4 pixels within a 3×3 region (e.g., a 3×3 quad).

Figure 22:
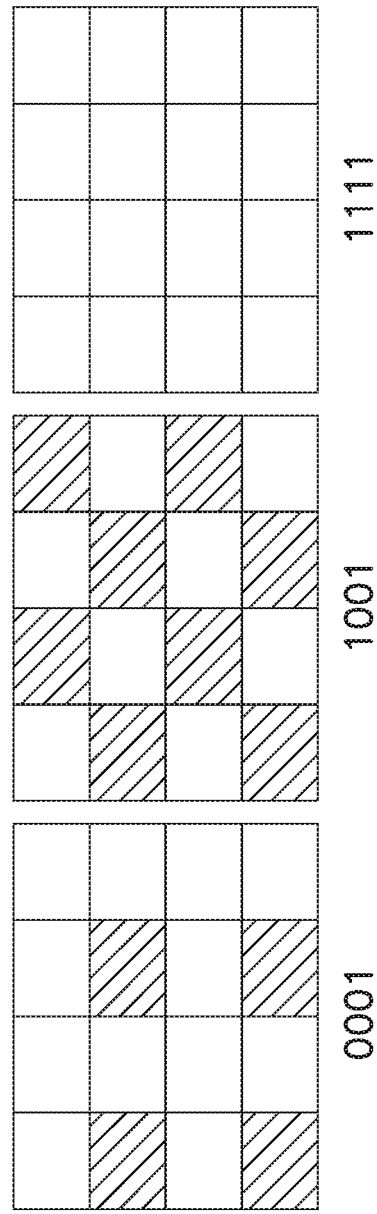
FIG. 22 illustrates an example arrangement of pixels.
Figure 23:
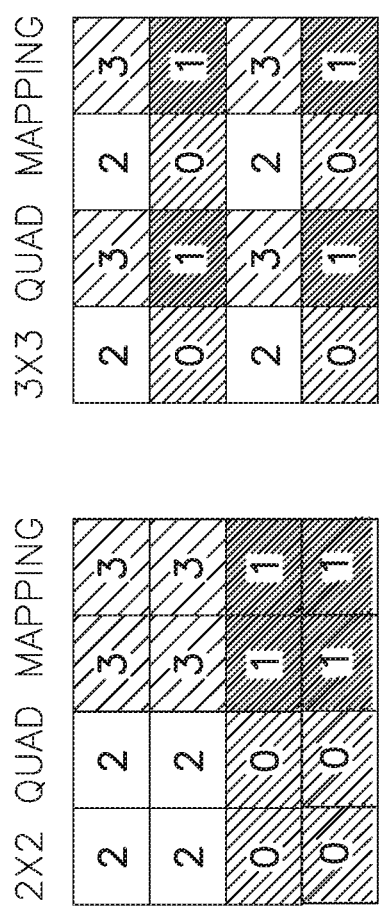
FIG. 23 illustrates an example pixel mapping.

In some cases, as shown in FIG. 22, arranging the pixels in the manner mentioned above may allow any 3×3 quad not rendered to be reconstructed from neighboring pixels that are rendered. In some cases, as long as at least one of the quads is rendered, any un-rendered pixels will have at least 1 rendered neighbor from which to be reconstructed. In some cases, AD also identifies an ordering as to which 3×3 quads are incrementally rendered with increasing render density. In some embodiments, such ordering may define 3 available rendering densities for a multiquad as the following sets of rendered quads: {0}, {0,3}, and {0,1,2,3}. In some cases, each of these densities may be represented by a one-hot encoded 4 bit value where each bit indicates whether or not the corresponding quad is rendered. In some cases, this code is called an adaptive desampling sample pattern (ADSP) code. FIG. 23 shows the correspondence between these codes (e.g., the ADSP codes) and the rendered pixels within a multiquad. In some embodiments, different reconstruction schemes may be used depending on the render density.

In some embodiments, AD may be used to determine which render density to use and where to maximize render work savings while minimizing information loss. In order to determine a desirable point in the trade-off between maximizing the render work savings while minimizing information loss, in some embodiments, the AD may render sparsely in areas of the image where the information loss is low (e.g., little detail is present in the final image) and may render densely in areas where the fine detail may be desired. In some embodiments, information loss may be estimated using the PSNR metric between an AD rendered image and the fully rendered version of the image. In some embodiments of the present disclosure, the AD may identify which regions of the image require more or less detail, when the final image itself is unknown, which may involve two passes of AD. For example, at the first pass, the depth edges may be identified using the edge detection operations on a depth buffer, and render density may be set at a relatively higher value where the edges occur. The image may be then rendered at the corresponding density. A second pass may identify the color edges (e.g., using available quads rendered in the first pass), and increase density where needed. In some embodiments, the AD may infer areas needing high or low density by inspecting user specified parameters that specify how the target image is sampled downstream.

As an alternative to the two pass approach, in another embodiment of AD, functional analysis may be used (as discussed with respect to FIG. 20) to infer the sampling function of an image in a shader program as a function of external dependencies. For example, in some embodiments, the texture method in glsl (e.g., OpenGL Shading Language) may accept an LOD parameter that specifies how the target texture is sampled. For higher values, the texture may be sampled with a lower LOD, returning a blurred version of the texture at the requested coordinate, and vice versa.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

What is claimed is:

1. A method of performing adaptive shading of image frames by a graphics processing unit (GPU), the method comprising:
    determining, by the GPU, a first shading rate based on determining that a change in a plurality of characteristics between a first image frame and a second image frame is above a first threshold;
    determining, by the GPU, a second shading rate based on determining that one or more viewports in the second image frame is similar to one or more viewports in the first image frame;
    determining, by the GPU, a third shading rate based on determining that a quality reduction filter is used; and
    selecting, by the GPU, a shading rate from among the first shading rate, the second shading rate, and the third shading rate for the first image frame.

2. The method of claim 1:
    reusing, by the GPU, pixel data from the first image frame to render the second image frame based on determining that the change in the plurality of characteristics between the first image frame and the second image frame is below the first threshold, wherein the pixel data from the first image frame is projected to the first image frame.

3. The method of claim 2, further comprising:
    reusing, by the GPU, the pixel data from the first image frame to render the second image frame by reprojecting the pixel data from the first image frame to the second image frame.

4. The method of claim 1, wherein the change in the plurality of characteristics between the first image frame and the second image frame is related to a camera and the one or more viewports in the first image frame or the one or more viewports in the second image frame.

5. The method of claim 1, further comprising:
    reusing, by the GPU, pixel data from the first image frame to render the second image frame based on determining that a change between the one or more viewports in the second image frame and the one or more viewports in the first image frame is below a second threshold, wherein the pixel data from the first image frame is projected to the first image frame, wherein the method further comprises reusing, by the GPU, the pixel data from the first image frame to render the second image frame by reprojecting the pixel data from the first image frame to the second image frame.

6. The method of claim 1, wherein determining that the quality reduction filter is used comprises:
    determining, by the GPU, a reduction in a quality of the second image frame;
    determining, by the GPU, if an output color of the second image frame corresponds to a weighted sum of pixel data from the first image frame; and
    determining, by the GPU, the third shading rate for the first image frame based on determining that the output color of the second image frame corresponds to the weighted sum of the pixel data from the first image frame.

7. The method of claim 6, wherein determining that the output color of the second image frame corresponds to the weighted sum of the pixel data from the first image frame comprises determining, by the GPU, a functional of a function in a pixel shader in the GPU based on determining that the quality reduction filter is used in the GPU for the second image frame.

8. The method of claim 7, wherein a proportional relationship between a number of shaded samples in the first image frame and a number of input values to the functional is based on the GPU.

9. The method of claim 7, wherein the functional is configured to:
    determine the third shading rate for the first image frame.

10. The method of claim 6, wherein the weighted sum comprises the weighted sum of the pixel data of the first image frame, over a plurality of input image frames of which the first image frame is an image frame from among the plurality of input image frames.

11. The method of claim 1, wherein the quality reduction filter comprises one or more of a depth-of-field filter, motion blur filter, and a smoothing filter.

12. The method of claim 1, wherein the quality reduction filter is configured to average over multiple samples from input textures rendered on the GPU.

13. A system for performing adaptive shading of image frames comprising:
    a memory; and
    a graphics processing unit (GPU) coupled to the memory, wherein the GPU is configured to:
    determine, a first shading rate based on determining that a change in a plurality of characteristics between a first image frame and a second image frame is above a first threshold;
    determine, a second shading rate based on determining that one or more viewports in the second image frame is similar to one or more viewports in the first image frame;
    determine, a third shading rate based on determining that a quality reduction filter is used; and
    select, a shading rate from among the first shading rate, the second shading rate, and the third shading rate for the first image frame.

14. The system of claim 13, wherein the GPU is further configured to:
    reuse pixel data from the first image frame to render the second image frame based on determining that the change in the plurality of characteristics between the first image frame and the second image frame is below the first threshold, wherein the pixel data from the first image frame is projected to the first image frame.

15. The system of claim 14, wherein the GPU is further configured to:
    reuse the pixel data from the first image frame to render the second image frame by reprojecting the pixel data from the first image frame to the second image frame.

16. The system of claim 13, wherein the change in the plurality of characteristics between the first image frame and the second image frame is related to camera and the one or more viewports in the first image frame or the one or more viewports in the second image frame, wherein pixel data from the first image frame is projected to the first image frame, wherein the GPU is further configured to:
    reuse pixel data from the first image frame to render the second image frame based on determining that a change between the one or more viewports in the second image frame and the one or more viewports in the first image frame is below a second threshold by reprojecting the pixel data from the first image frame to the second image frame.

17. The system of claim 13, wherein the GPU is further configured to:
    determine, a reduction in a quality of the second image frame;
    determine, if an output color of the second image frame corresponds to a weighted sum of pixel data from the first image frame; and
    determine, the third shading rate for the first image frame based on determining that the output color of the second image frame corresponds to the weighted sum of the pixel data from the first image frame, determining that the output color of the second image frame corresponds to the weighted sum of the pixel data from the first image frame comprises determining a functional of a function in a pixel shader in the GPU based on determining that the quality reduction filter is used in the GPU for the second image frame.

18. The system of claim 17, wherein a proportional relationship between a number of shaded samples in the first image frame and a number of input values to the functional is based on the GPU, wherein the functional is configured to:
    determine the third shading rate for the first image frame.

19. A method of performing adaptive shading of image frames by a graphics processing unit (GPU), the method comprising:
    determining, by the GPU, if a quality reduction filter is used by applying one or more heuristics to a pixel shader in the GPU;
    determining, by the GPU, a functional of a function in the pixel shader based on determining that the quality reduction filter is used in the GPU;
    determining, by the GPU, a first shading rate of a first image frame based on the functional; and
    rendering, by the GPU, the first image frame based on the first shading rate.

20. The method of claim 19, wherein the rendering the first image frame comprises rendering, by the GPU, at least a first portion of the first image frame based on the first shading rate, wherein the first portion of the first image frame is a rendered subset of pixels in the first image frame.

* * * * *